(12) United States Patent
Huang et al.

(10) Patent No.: US 10,019,656 B2
(45) Date of Patent: Jul. 10, 2018

(54) DIAGNOSTIC SYSTEM AND METHOD FOR BIOLOGICAL TISSUE ANALYSIS

(71) Applicant: Lehigh University, Bethlehem, PA (US)

(72) Inventors: Xiaolei Huang, Center Valley, PA (US); Sunhua Wan, Bethlehem, PA (US); Chao Zhou, Bethlehem, PA (US)

(73) Assignee: LEHIGH UNIVERSITY

( * ) Notice: Subject to any disclaimer, the term of this patent is extended or adjusted under 35 U.S.C. 154(b) by 0 days.

(21) Appl. No.: 15/097,780

(22) Filed: Apr. 13, 2016

(65) Prior Publication Data

US 2016/0232425 A1    Aug. 11, 2016

Related U.S. Application Data

(63) Continuation-in-part of application No. PCT/US2014/064218, filed on Nov. 6, 2014.
(Continued)

(51) Int. Cl.
*G06K 9/00* (2006.01)
*G06K 9/62* (2006.01)
(Continued)

(52) U.S. Cl.
CPC ......... *G06K 9/628* (2013.01); *G06K 9/00147* (2013.01); *G06K 9/629* (2013.01); *G06K 9/6271* (2013.01); *G06T 7/0012* (2013.01); *G06T 7/11* (2017.01); *G06T 7/40* (2013.01); *G06T 7/41* (2017.01); *G06T 11/60* (2013.01); *G06K 2009/4666* (2013.01); *G06T 2207/10056* (2013.01); *G06T 2207/10101* (2013.01); *G06T 2207/20021* (2013.01);
(Continued)

(58) Field of Classification Search
CPC ..................................................... G06K 9/628
See application file for complete search history.

(56) References Cited

U.S. PATENT DOCUMENTS 7,298,897 B1 * 11/2007 Dominguez ............. G06K 9/38
382/172
8,047,990 B2    11/2011 Burdette et al.
(Continued)

OTHER PUBLICATIONS

Corresponding International Search Report and Written Opinion for PCT/US2014/064218 dated Feb. 17, 2015. WO.

*Primary Examiner* — Oneal R Mistry
(74) *Attorney, Agent, or Firm* — The Belles Group, P.C.

(57) ABSTRACT

A computer diagnostic system and related method are disclosed for automatically classifying tissue types in an original tissue image captured by an imaging device based on texture analysis. In one embodiment, the system receives and divides the tissue image into multiple smaller tissue block images. A combination of local binary pattern (LBP), average LBP (ALBP), and block-based LBP (BLBP) feature extractions are performed on each tissue block. The extractions generate a set of LBP, ALBP, and BLBP features for each block which are used to classify its tissue type. The classification results are visually displayed in a digitally enhanced map of the original tissue image. In one embodiment, a tissue type of interest is displayed in the original tissue image. In another or the same embodiment, the map displays each of the different tissue types present in the original tissue image.

22 Claims, 18 Drawing Sheets

Related U.S. Application Data

(60) Provisional application No. 61/900,828, filed on Nov. 6, 2013.

(51) Int. Cl.
- *G06T 7/00* (2017.01)
- *G06T 7/40* (2017.01)
- *G06T 11/60* (2006.01)
- *G06T 7/11* (2017.01)
- *G06T 7/41* (2017.01)
- *G06K 9/46* (2006.01)

(52) U.S. Cl.
CPC ............ *G06T 2207/20081* (2013.01); *G06T 2207/30024* (2013.01); *G06T 2207/30068* (2013.01); *G06T 2207/30096* (2013.01)

(56) References Cited

U.S. PATENT DOCUMENTS

| | | | |
|---|---|---|---|
| 8,473,035 B2* | 6/2013 | Frangioni | A61B 5/415 600/476 |
| 2008/0033657 A1 | 2/2008 | Cline et al. | |
| 2009/0324051 A1* | 12/2009 | Hoyt | G01N 1/30 382/133 |
| 2010/0098306 A1* | 4/2010 | Madabhushi | G06K 9/0014 382/128 |
| 2012/0130243 A1 | 5/2012 | Balocco et al. | |
| 2013/0286038 A1* | 10/2013 | Kamath | G06K 9/00134 345/592 |
| 2014/0044361 A1* | 2/2014 | Lee | G06K 9/6211 382/201 |
| 2014/0247972 A1* | 9/2014 | Wang | G06K 9/6227 382/133 |
| 2016/0203599 A1* | 7/2016 | Gillies | A61B 6/463 382/132 |

* cited by examiner

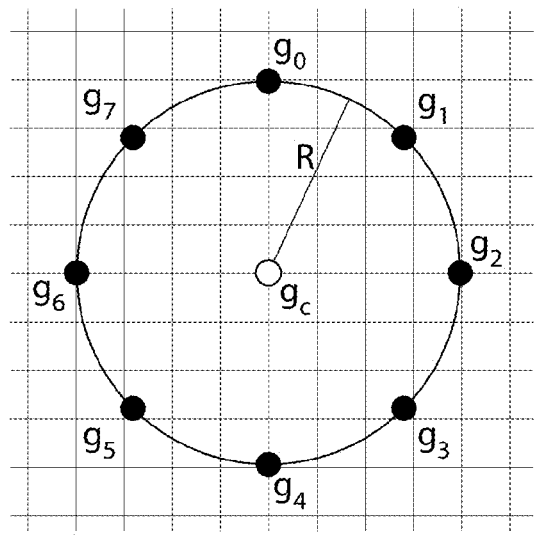
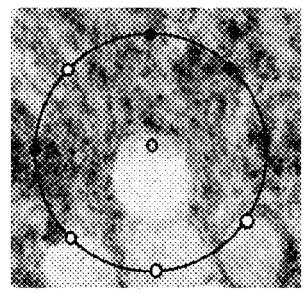
FIG. 8B
FIG. 8A
Image 1
LBP: 11111111
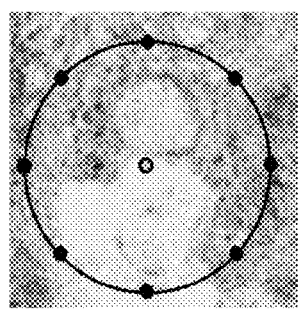
Image 2
LBP: 11111111
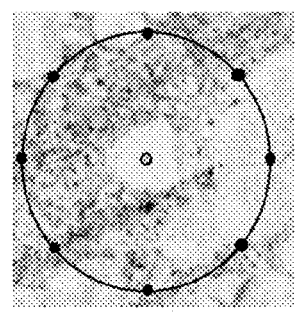
Image 1
ALBP: 10110011
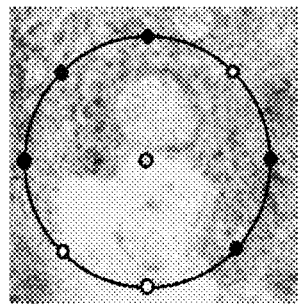
Image 2
ALBP: 10000111
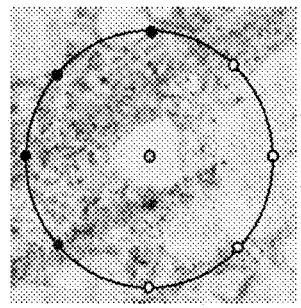
FIG. 9

OCM image of lobule         OCM image of fat

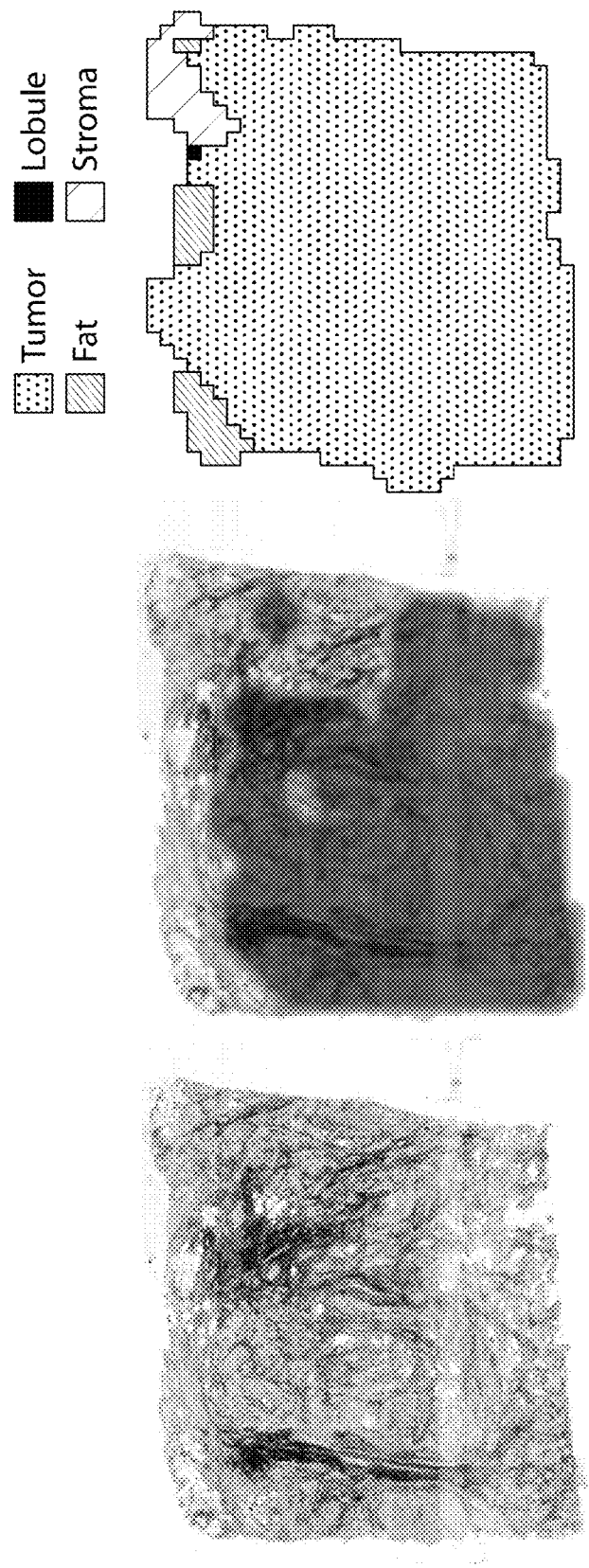

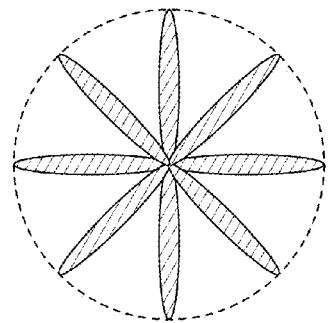
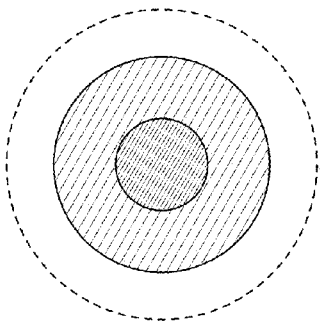
FIG. 14A   FIG. 14B
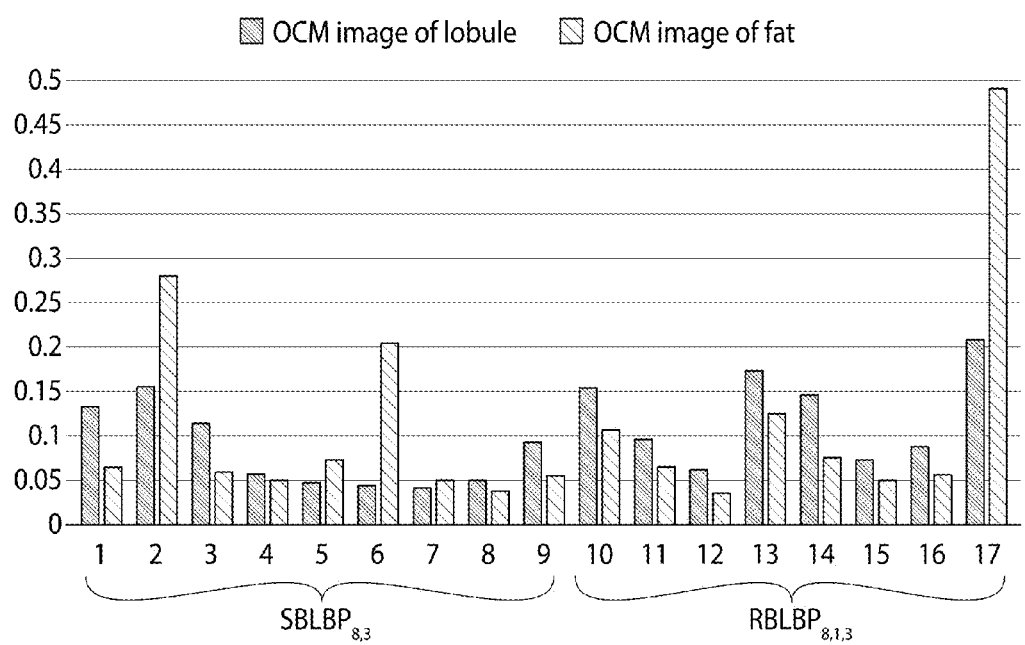
FIG. 15

DIAGNOSTIC SYSTEM AND METHOD FOR BIOLOGICAL TISSUE ANALYSIS

CROSS-REFERENCE TO RELATED APPLICATIONS

The present application is a continuation-in-part of PCT/US2014/064218 filed Nov. 6, 2014, which claims the benefit of U.S. Provisional Patent Application Ser. No. 61/900,828 filed Nov. 6, 2013, the entireties of which are incorporated herein by reference.

STATEMENT OF GOVERNMENT INTEREST

This invention was made with government support under National Institute of Health/National Institute of Biomedical Imaging and Bioengineering (NIH/NIBIB) Pathway to Independence Award (R00-EB010071) and under National Institutes of Health/National Library of Medicine (NLM) award (NLM-HHSN276201000693P). The government has certain rights in the invention.

BACKGROUND OF THE INVENTION

The present invention generally relates to biological tissue imaging, and more particularly to a computer-based system and method for analyzing the texture of tissue samples and classifying the tissue to detect abnormalities which provides a medical diagnostic tool.

Breast cancer is a high incidence cancer in women worldwide. The survival rate of breast cancer improves with screening and early detection. Biopsy is a frequently used medical test in which tissue samples are removed from a human subject and then examined by a pathologist under a microscope to determine the presence or extent of a disease. Traditionally, the tissue is processed to extremely thin slices and stained before being observed under a microscope. Optical coherence tomography (OCT) provides an alternative non-invasive optical imaging modality that can provide 3D, high-resolution images of biopsy sample tissues without staining. Optical coherence microscopy (OCM) combines the advantages of OCT and confocal microscopy using high numerical aperture objectives to provide cellular resolution images. OCT, OCM and other images captured by optical imaging devices are label free, in the sense that they do not use staining of samples to indicate different tissue areas. In contrast, traditional histological images rely on staining of samples with at least one biomarker. Thus, in order to classify different tissue types in OCT, OCM and other optical images, advanced computer algorithms are required to analyze the appearance differences in different tissue areas.

To improve accuracy and efficiency, numerous computer aided diagnostic methods implementing software program algorithms for automated classification of tissue areas in medical images have been proposed. The same level of accuracy offered by such automated techniques and speed cannot reasonably be duplicated by manual analysis of tissue images alone. Experiments show that a spectral texture analysis technique is good at extracting distinctive texture features from OCT images, even if the images have few structure features. Image processing and data mining techniques are applied on a large number of medical images to distinguish different patterns of tissues.

Texture analysis is a commonly used technique for medical image classification. There are mainly two different kinds of texture analysis techniques: structure based methods and statistical methods, including spectrum analysis and feature distributions.

In the structure based methods, typical texture patterns of an image are extracted and clustered into several groups. The frequency of the occurrence of each pattern is used to represent the texture. Structure based methods are good at classification of texture images that are highly repetitive, since the clustering step reserves more information from the texture image if a certain kind of texture pattern appears in the image frequently. But for OCT/OCM images of human tissue, very few texture patterns are exactly the same, so that structure based methods do not perform well in OCT/OCM image based tissue classification.

In statistical methods, required features are extracted and the frequency of the occurrence of each feature in the whole texture image is used to represent the texture. Different texture features are used in statistical methods, including grey-level co-occurrence matrix, center-symmetric auto-correlation, gray level difference, and local binary patterns (LBP). The statistical distribution of different features are calculated and used as feature vectors for texture representation. Since the statistical methods do not require texture images to be highly repetitive, they are suitable to be used for the OCT/OCM image based tissue classification.

LBP is a popular statistical texture analysis technique pursued in recent years. In LBP features, the frequency of different local image intensity feature patterns is calculated and used as feature vectors. LBP features have been applied in many applications, such as texture analysis, face recognition, and description of regions of interest. LBP is rotation invariant and uses a fixed set of patterns to represent the texture. It has high classification accuracy on different texture image datasets. Although LBP is relatively effective in representing and classifying textures in OCT/OCM images, further improvement in tissue classification accuracy however are desired particularly for medical diagnostic purposes.

SUMMARY OF THE INVENTION

A computer aided diagnostic system is disclosed that provides tissue classification and abnormality detection techniques based on texture analysis of a tissue specimen or sample imaged using an imaging device. A novel image analysis technique is applied on tissue images to achieve automatic classification and display of tissue types found in the sample. The image analysis technique uses a new variant of local binary pattern (LBP) features, average local binary pattern (ALBP) features and block based local binary pattern (BLBP) features for use in texture analysis of tissue images. The ALBP AND BLBP features are integrated with the LBP features to achieve more accurate image and tissue classification. In various embodiments, the imaging device may be without limitation an optical coherence microscopy (OCM) system, optical coherence tomography (OCT) system, confocal microscopy system, or two photon microscopy system. The present automated diagnostic system may be used for identifying diseases manifested by visually observable tissue abnormalities such as cancer detection, and particularly in one non-limiting example for breast cancer detection. Other applications are possible.

The present tissue classification process generally includes two primary steps: training and testing. In the training process, a series of LBP features which represent image textures are extracted from digital tissue images. Similarly, a series of ALBP features which represent image textures are also extracted from digital tissue images. In LBP texture analysis, the grayscale values of a certain number of neighbor pixels are compared with the grayscale value of a center pixel to generate a binary code pattern. By contrast, ALBP texture analysis compares the grayscale value of a neighbor with the average grayscale value of all neighbors, instead of comparing it to the grayscale value of the center pixel. The results of the LBP and ABLP are combined and integrated in the present system. By using integrated ABLP and LBP features instead of LBP features alone, the inventors have discovered that classification accuracy can be improved.

According to further aspects of the invention, the diagnostic system can generate a tumor probability heat map based on the original captured tissue image in which highly suspect areas are digitally enhanced on the original grayscale tissue image, thereby advantageously providing rapid diagnostic capabilities at a glance. The system can also further generate an enhanced multi-class tissue classification map based on the LBP and ALBP integrated features which identifies all different tissue types found in the sample which is helpful for diagnostic purposes. In one embodiment, the heat map and tissue classification map may be colored and/or patterned.

In one aspect, a computer-aided diagnostic system for analyzing tissue image data includes a non-transitory computer readable medium having software program instructions stored thereon, a computer processor communicating with the computer readable medium, the processor when configured with and executing the program instructions being operable to: receive an original tissue image captured by a label free optical imaging device; divide the original tissue image into a plurality of smaller tissue blocks which collectively represent the captured original tissue image, each tissue block having a texture; analyze each tissue block based on its texture to classify a type of tissue found in each tissue block; and generate a digitally enhanced map overlaid on the original tissue image displaying a predetermined tissue type of interest in a visually discernible highlighted manner.

In another aspect, a computer-aided diagnostic system for analyzing tissue image data includes a non-transitory computer readable medium having software program instructions stored thereon, a computer processor communicating with the computer readable medium, the processor when configured with and executing the program instructions being operable to: receive an original tissue image captured by a label free optical imaging device; divide the original tissue image into a plurality of smaller tissue blocks which collectively represent the captured original tissue image, each tissue block having a texture; extract a local binary pattern feature, an average local binary pattern feature, and block based local binary pattern features for each tissue block; classify a type of tissue based on the texture features extracted from each tissue block according to pre-defined types of contextually relevant tissues found in the original tissue image; and display a digitally enhanced image of the original tissue image which shows at least one type of tissue in a visually discernible manner.

In another aspect, a computer aided diagnostic method for automatically classifying tissue types in a digital tissue image is provided. The method is implemented by a processor executing program instructions and comprising steps of: receiving an original tissue image captured by a label free optical imaging device; dividing the original tissue image into a plurality of smaller tissue blocks which collectively represent the captured original tissue image, each tissue block having a texture; classifying a type of tissue found in each tissue block based on its texture; and displaying a digitally enhanced map of the original tissue image in which at least one tissue type is shown in a visually discernible manner from other portions of the original image.

BRIEF DESCRIPTION OF THE DRAWINGS

The features of the exemplary embodiments will be described with reference to the following drawings where like elements are labeled similarly, and in which:

FIG. 8A is diagram illustrating a coordinate reference system and points for obtaining a local binary pattern (LBP) feature from an OCM image;

FIG. 8B is an OCM image demonstrating the LBP feature superimposed on the image;

FIG. 9 shows LBP and average local binary pattern (ALBP) features (represented by binary numbers) extracted by the present system from OCM images;

FIG. 11A is an OCM image of a tissue specimen of the type which can be analyzed by the present system for classifying and displaying tissue types;

FIG. 11B shows a heat map generated and displayed by the present system highlighting a tissue type of interest which is overlaid onto the original OCM image of FIG. 11A;

FIG. 11C shows a multi-class tissue classification type showing all the different tissue types present in the OCM image of FIG. 11A;

FIG. 14A shows a spoke-shaped block based local binary pattern (SBLBP);

FIG. 14B shows a ring shaped block based local binary pattern (RBLBP);

FIG. 15 shows BLBP (SBLBP and RBLBP) features for each of the tissue types/classes of FIG. 10A;

All drawings shown herein are schematic and not to scale. Parts given a reference number in one figure may be considered to be the same parts where they appear in other figures without a reference number for brevity unless specifically labeled with a different part number and/or described herein.

DETAILED DESCRIPTION

Figure 1:
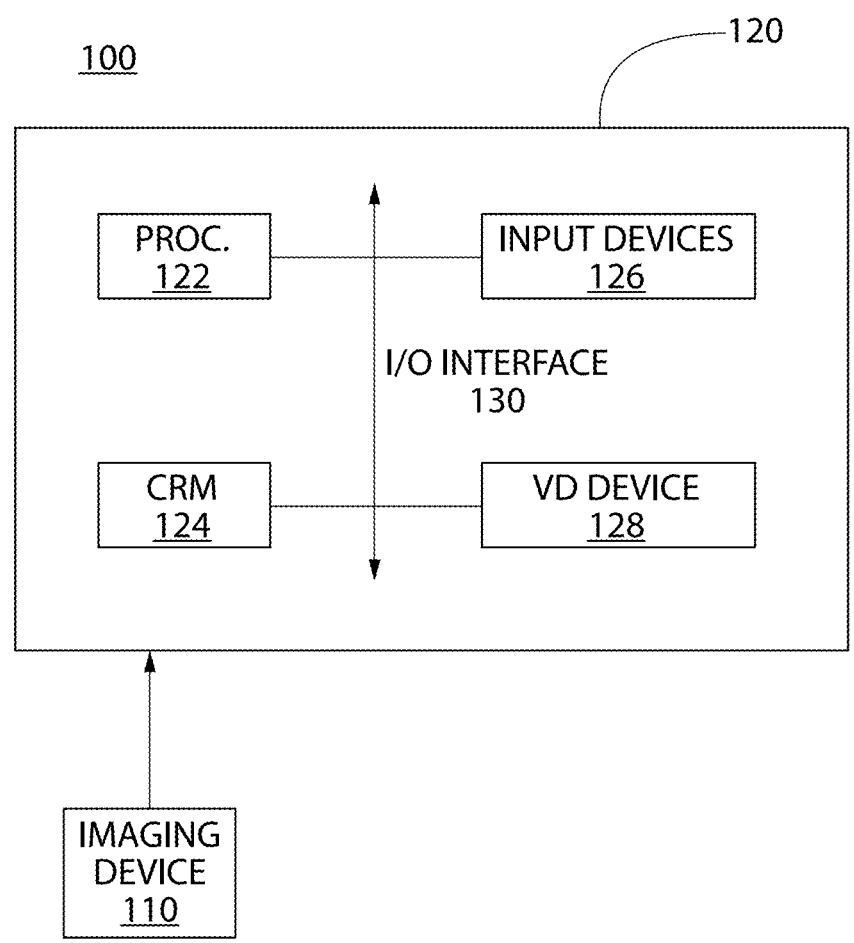
FIG. 1 is a schematic diagram showing exemplary system architecture of a computer-aided medical diagnostic system according to the present disclosure.

The features and benefits of the invention are illustrated and described herein by reference to non-limiting exemplary embodiments. This description of the embodiments is intended to be read in connection with the accompanying drawings, which are to be considered part of the entire written description. Accordingly, the invention expressly should not be limited to such embodiments illustrating some possible non-limiting combination of features that may exist alone or in other combinations of features; the scope of the invention being defined by the claims appended hereto.

In the description of embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures may be secured or attached to one another either directly or indirectly through intervening structures, as well as both movable or rigid attachments or relationships, unless expressly described otherwise.

Aspects of the present invention may be implemented in software, hardware, firmware, or combinations thereof. The present invention may be embodied in the form of computer-implemented processes and apparatuses for practicing those processes. The computer programs described herein are not limited to any particular embodiment, and may be implemented in an operating system, application program, foreground or background process, driver, or any combination thereof, executing on a single computer or server processor or multiple computer or server processors. Processors described herein may be one or more of any of a computer/server central processing unit (CPU), multi-core processor including two or more independent CPUs, microprocessor, micro-controller, or other computational device or circuit configured for executing computer program instructions (e.g. control logic or code).

The present invention may also be embodied in the form of computer program code embodied in tangible non-transitory computer readable media, such as without limitation random access memories (RAM), read only memories (ROMs), CD-ROMs, DVDs, hard drives, ZIP™ disks, magnetic floppy drives, memory sticks, magnetic tape, or any other computer-readable storage media which, when the computer program code is loaded into and executed by a computer processor, the processor becomes configured as an apparatus for practicing the invention. When implemented on a general-purpose processor, the computer program code segments configure and customize the processor forming control logic circuits that transform the processor into a special purpose processor for practicing the present invention.

A non-limiting exemplary embodiment of the present invention will now be described for convenience without limitation to investigation of human breast tissue for the presence of a carcinoma. However, the invention is not limited thereto in its use and may find broad application to other types of animal tissue examination (e.g. human or non-human) for any purpose whether the tissue sample images captured by an imaging device are obtained ex vivo or in vivo.

Terms describing actions herein of the present system generally refer to actions performed and executed by specially configured data processing hardware such as a processor of an electronic computer or similar system, unless stated otherwise. Such data processing systems manipulate and transform data represented as physical quantities (e.g., electrical/electronic) within registers and memory into other forms of data represented as physical quantities within registers and memory of the computer system memories or registers when the processor is programmed with and executes appropriately configured control logic or software program instructions.

FIG. 1 is a block diagram of an exemplary computer aided diagnostic system 100 for implementing the present invention. The processor-based system 100 includes an imaging device 110 for capturing a tissue image and a computer system 120 operably coupled to and communicating with the imaging device. The imaging device 110 and computer system 120 may be connected over a wired or wireless network, or via a wired or wireless direct connection using any suitable method or communication protocol. The computer system 120 may be a desktop personal computer, a portable laptop or tablet computer or other type portable device, a mainframe computer, a server, or other programmable data processing devices capable of storing and processing data.

In one embodiment, the computer system 120 may include at least one programmable computer processor 122 such as a central processing unit (CPU) or other type processor, non-transitory computer readable medium (CRM) 124, input devices 126 (e.g. keyboard, mouse, audio microphone, etc.), visual display (VD) device 128 (e.g. graphic display monitor), and input/output interface 130 operably connecting and establishing communication between the foregoing system devices. The computer readable medium 124 is accessible to processor 122 via input/output interface 130 for exchanging data and program instructions. Various circuits and ancillary or peripheral devices (e.g. power supply, clock drive, etc.) may be provided to form a fully functional system as will be known to those skilled in the art. Auxiliary electronic components may be also provided and operably connected with the computer system 120 (e.g. data storage devices, printers, etc.) via wired or wireless connections.

Computer processor 122 may be connected to a wired or wireless communication infrastructure (e.g., a communications bus, cross-over bar, local area network (LAN), or wide area network (WAN). Processor 122 is programmable with control logic steps or instructions (i.e. computer program code or instructions) to form a special purpose processor for performing processor-based processes which are particularly adapted to analyzing and classifying tissues and displaying results as described herein.

Computer-readable medium 124 may be any media accessible to processor 122 that is operable to store data and computer program instructions used by the processor to implement the present invention. The computer readable medium 124 may include removable or non-removable types of both volatile and nonvolatile media. For example, computer readable medium 124 that may be used include without limitation random access memory (RAM), read-only memory (ROM), electrically erasable programmable read-only memory (EEPROM), flash memory, or other type memory technology, CD-ROM, digital versatile disk (DVD), Blu-ray disk, internal/external hard disk drives, or data storage devices such as optical disk storage, magnetic cassettes, magnetic tape, magnetic disk storage, ZIP™ drive, or other magnetic storage devices, or any other medium which can be used to store data and information that is readable, writeable, and retrievable by computer processor 122. Other types of readable data storage media may be used.

The computer system 120 may also include appropriately configured communication interfaces. Communications interfaces allow software and data to be transferred between computer processor 122 and external devices. Examples of communications interfaces that may be provided include without limitation a modem, a network interface (such as an Ethernet or wireless network card), a communications port, a Personal Computer Memory Card International Association (PCMCIA) slot and card, bar code reader, USB, Blue Tooth, or the like. Software and data transferred via communications interface are in the form of signals which may be electronic, electromagnetic, optical, or any other signal capable of being received by the communications interface. These signals are provided to communications interface via a communications path or channel. The path or channel that carries the signals may be wired or wireless and implemented using wire or cable, fiber optics, a telephone line, a cellular link, a radio frequency (RF) link, or the like.

The computer program software or instructions for analyzing and classifying tissues and transforming an original captured tissue image into a digitally-enhanced displayed tissue image that facilitates a medical diagnosis are stored on computer readable medium 124. Computer processor 122 may be a general purpose computer system that becomes a specific purpose computer system when executing the program instructions describe herein. The program instructions are not limited to any particular programming language or implementation.

The imaging device 110 is a stand-alone imaging system operable to capture an image of a tissue sample which is relayed to computer system 100 for processing and analysis, as further described herein. The captured image may be a digital pixelated image formed by image data comprising a plurality of pixels. The image is communicating and transmitted electronically to the computer system 100 via wired or wireless connections for tissue analysis and classification. In some embodiments, without limitation, the imaging device 110 may be a commercially-available system using optical coherence microscopy (OCM), optical coherence tomography (OCT), confocal microscopy, or two photon microscopy to capture the image. In one preferred embodiment, OCM may be used which combines the benefits of both OCT and confocal microscopy. The imaging device captures the tissue sample with sufficient resolution to permit identification of different tissue types for analysis and classification as normal or diseased tissue.

Feature Extraction

The present invention in one embodiment uses a combination of LBP (local binary patterns) and ALBP (average local binary patterns) techniques to extract features from original OCM tissue images. Features extracted from OCM images are utilized for automatic identification of different tissue types using computer system 120.

LBP are used as features to describe textures in a grayscale image. The LBP algorithm divides the image into blocks and compares the intensity of a center pixel with the intensity values of its neighbors.

$$LBP_{P,R} = \sum_{p=0}^{P-1} s(g_p - g_c)2^p,$$

$$s(x) = \begin{cases} 1, & x \geq 0 \\ 0, & x \leq 0 \end{cases}$$

where P is the number of neighbor pixels, R is the radius of the neighborhood, $g_c$ is the grayscale value of the center pixel, $g_p$ is the gray scale value of neighbor pixels. $LBP_{P,R}$ selects P neighbors of the center pixel with the radius R. FIG. 8A shows an illustration of $LBP_{8,4}$. Suppose the center pixel is located in (0,0), then $g_p$ is located in $$\left(R\sin\left(p\frac{2\pi}{P}\right), R\cos\left(p\frac{2\pi}{P}\right)\right).$$

FIG. 8B shows an example of obtaining a LBP feature from the OCM image. The figure shows a LBP feature with the LBP pattern represented as "11100010". For $LBP_{P,R}$, there are $2^P$ possible patterns. To achieve rotation invariance, a function $U(LBP_{P,R})$ is defined as the number of 0/1 changes in a circular binary pattern:

$$U(LBP_{P,R}) = [s(g_{P-1} - g_c) - s(g_c - g_c)] + \sum_{p=1}^{P-1} |s(g_p - g_c) - s(g_{p-1} - g_c)| \quad (2)$$

So, the LBP feature shown in FIG. 8B has U value of U("11100010")=4.

Among all the LBP patterns, the most frequent patterns are the uniform patterns which have limited discontinuity in the circular binary representations thus have small U values. Based on the U values, a rotation-invariant feature $LBP_{P,R}^{riu2}$ is defined as:

$$LBP_{P,R}^{riu2} = \begin{cases} \sum_{p=0}^{P-1} s(g_p - g_c), & \text{if } U(LBP_{P,R}) \leq 2 \\ P+1, & \text{otherwise} \end{cases} \quad (3)$$

Figure 10A:
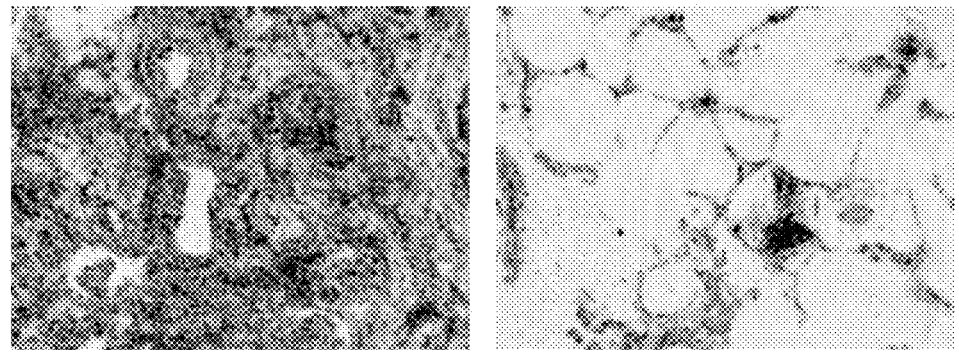
FIG. 10A shows OCM images of tissue image blocks of two different types or classes of tissues.
Figure 10B:
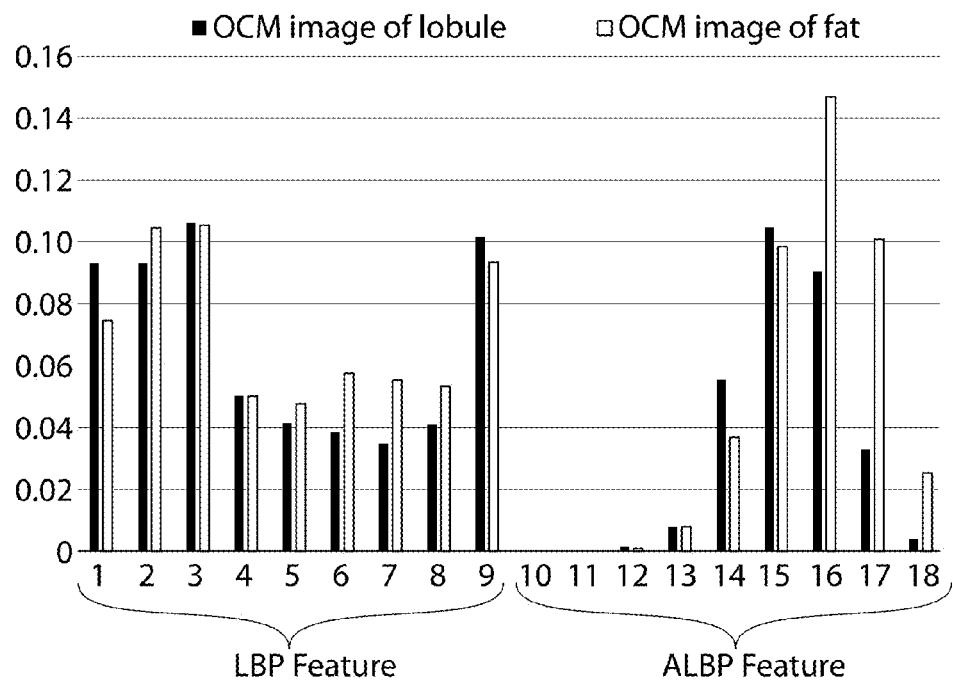
FIG. 10B shows the LBP and ALBP features for each of the tissue types/classes of FIG. 10A.

There are a total of P+2 possible values for $LBP_{P,R}^{riu2}$. For each pixel in a N×N image, the $LBP_{P,R}^{riu2}$ value is calculated. Excluding those pixels that have distance less than R from image boundary, we get $(N-2R)^2$ $LBP_{P,R}^{riu2}$ values. The number of occurrences of each $LBP_{P,R}^{riu2}$ value in an image is calculated and represented in a histogram. The histogram is then normalized and saved as a LBP feature vector for the image, as shown in FIG. 10B Columns 1-9. By changing the parameters—the radius R and number of neighbors P—a variety of LBP features can be generated for the image.

According to the present invention, in addition to the above LBP features, a new variant of LBP feature is used, namely the Average LBP (ALBP) feature, which compares each neighbor pixel with the average grayscale value of all neighbors:

$$ALBP_{P,R} = \sum_{p=0}^{P-1} s(g_p - g_\varepsilon)2^p, \text{ where} \quad (4)$$

$$g_\varepsilon = \left(\sum_{p=0}^{P-1} g_p\right)/P$$

We calculate the rotation-invariant features $ALBP_{P,R}^{riu2}$ by applying the same operations we described above which transform $LBP_{P,R}$ to $LBP_{P,R}^{riu2}$:

$$ALBP_{P,R}^{riu2} = \begin{cases} \sum_{p=0}^{P-1} s(g_p - g_\varepsilon), & \text{if } U(ALBP_{P,R}) \le 2 \\ P+1, & \text{otherwise} \end{cases} \quad (5)$$

Then, a variety of ALBP features can be generated for the image.

In comparison, a LBP feature can reveal the relationship between the center pixel and its neighbors, whereas an ALBP feature reveals more specific relationship among the neighbors than the original LBP feature. FIG. 9 shows two different OCM images that have the same LBP features but different ALBP features in a neighborhood. Images 1 LBP and 2 LBP show that for the center pixel, the two different images both have the same LBP pattern that can be represented by a binary number "11111111". Images 1 ALBP and 2 ALBP show that for the same center pixel, the two images have different ALBP feature patterns, which can be represented by binary number "10110011" and "10000111" respectively. By integrating the LBP and ALBP features, image classification accuracy advantageously can be improved.

LBP and ALBP are complementary. LBP features are powerful at representing the relationship of grayscale intensity values between the center pixel and the neighbors, while ALBP features are more sensitive to the intensity change in the neighborhood area. FIG. 10B shows the integrated feature of $LBP_{8,10}^{riu2}$ and $ALBP_{8,10}^{riu2}$ for two different OCM images shown in FIG. 10A left and right images respectively. In the feature vector (FIG. 10B), Columns 1-9 represent $LBP_{8,10}^{riu2}$ and columns 10-18 represent $ALBP_{8,10}^{riu2}$. From the figure we can see that the two OCM images have similar LBP features, but significantly different ALBP features.

In addition to ALBP, to further increase the discriminatory power of LBP texture features, alternative embodiments of the present invention may include yet another new variant of LBP, namely block based LBP (BLBP) features. BLBP compares the average intensity value of pixels in blocks of a certain shape in a neighborhood around the center pixel. Two different shapes of pixel blocks, namely "Spoke" and "Ring," may be used as described herein, and as shown in FIG. 14A and FIG. 14B.

The Spoke-shaped BLBP compares the intensity of the center pixel with the average intensities of neighbor pixels along P different directions, as demonstrated in FIG. 14A. It can be represented as:

$$SBLBP_{P,R} = \sum_{p=0}^{P-1} s(g_{p,s} - g_c)2^p$$

$$g_{p,s} = \left(\sum_{r=0}^{R} g_{p,r}\right)/(R+1)$$

where $g_{p,r}$ is the gray scale value of the pth neighbor pixel on the circle with radius r, $g_{p,s}$ is the average intensity value of all the pixels along the pth neighbor's direction for all radii in [0,R]. We calculate the rotation-invariant features $SBLBP^{riu2}$ by applying the following transformation:

$$SBLBP_{P,R}^{riu2} = \begin{cases} \sum_{p=0}^{P-1} s(g_{p,s} - g_c), & \text{if } U(SBLBP_{P,R}) \le 2 \\ P+1, & \text{otherwise} \end{cases}$$

There are a total of P+2 different binary-number patterns for $SBLBP^{riu2}$.

The Ring-shaped BLBP compares the intensity of the center pixel with the average intensities of neighbors in ring shaped areas around the center pixel, as demonstrated in FIG. 14B. It can be represented as:

$$RBLBP_{P,R,N} = \sum_{i=0}^{N-1} s(g_i - g_c)2^i,$$

$$g_i = \left(\sum_{p=0}^{P-1} \sum_{r=i*R}^{(i+1)*R} g_{p,r}\right)/RP$$

where i is the index of the ith ring between radius i*R and radius (i+1)*R around the center pixel, R is the difference of radius between two adjacent rings, N is the number of rings around the center pixel. The number of different patterns for RBLBP is $2^N$.

By calculating the frequency of each pattern with every pixel in the image as a center pixel, we can get SBLBP and RBLBP feature vectors which are normalized histograms of pattern occurrence. The overall BLBP feature vector is the concatenation of the SBLBP and RBLBP feature vectors as:

BLBP={SBLBP,RBLBP}

Comparing BLBP with LBP, a BLBP feature encodes richer information about the intensity distribution in blocks of different shape and scale in a neighborhood, whereas a LBP feature reveals more about the intensity differences between the center pixel and surrounding neighbor pixels. The BLBP feature is also more robust to noise than the LBP feature. FIG. 15 shows BLBP features of two different OCM images shown in FIG. 10A. We can see that the OCM images of lobules and fat tissues have similar LBP features as seen in FIG. 10B (Column 1-9), but distinctive BLBP features as seen in FIG. 15 (compare differences in relative heights of the feature bars in the chart).

Although LBP and ALBP texture analysis methods are used in the foregoing example to extract and generate tissue features from the digital images, the invention is not limited in this regard. Accordingly, in some embodiments other tissue feature extraction techniques (texture analysis methods) may be used in addition to or instead of LBP, ALBP and BLBP alone to further improve tissue classification accuracy.

Integrated Feature and Attribute Selection

Figure 12:
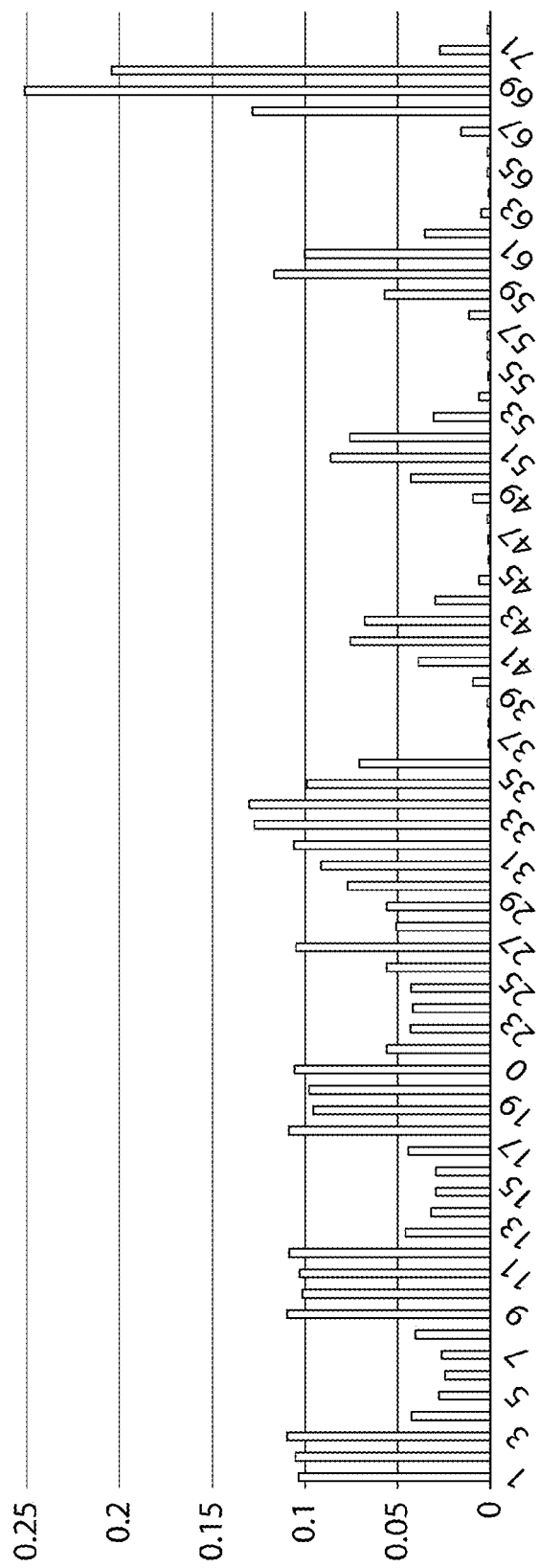
FIG. 12 shows an integrated multi-scale feature of a tumor OCM image including LBP and ALBP features.

Texture features of different scales appear in human breast tissue OCM images. LBP and ALBP feature with different radius parameters capture texture features of different scales. In the present invention, a series of LBP and ALBP features with different radius parameters may be used. A multi-scale feature is constructed by integrating LBP and ALBP features with different radius parameters. These features are then evaluated in the attribute selection phase and the most representative attributes in the integrated feature are selected to be used to construct the classifiers. FIG. 12 shows an integrated multi-scale feature of a tumor OCM image comprising: dimension 1-9: $LBP_{8,2}^{riu2}$, dimension 10-18: $LBP_{8,8}^{riu2}$, dimension 19-27: $LBP_{8,4}^{riu2}$, dimension 28-36: $LBP_{8,2}^{riu2}$, dimension 37-45: $ALBP_{8,8}^{riu2}$, dimension 46-54: $ALBP_{8,8}^{riu2}$, dimension 55-63: $ALBP_{8,4}^{riu2}$, dimension 64-72: $ALBP_{8,2}^{riu2}$.

Figure 16:
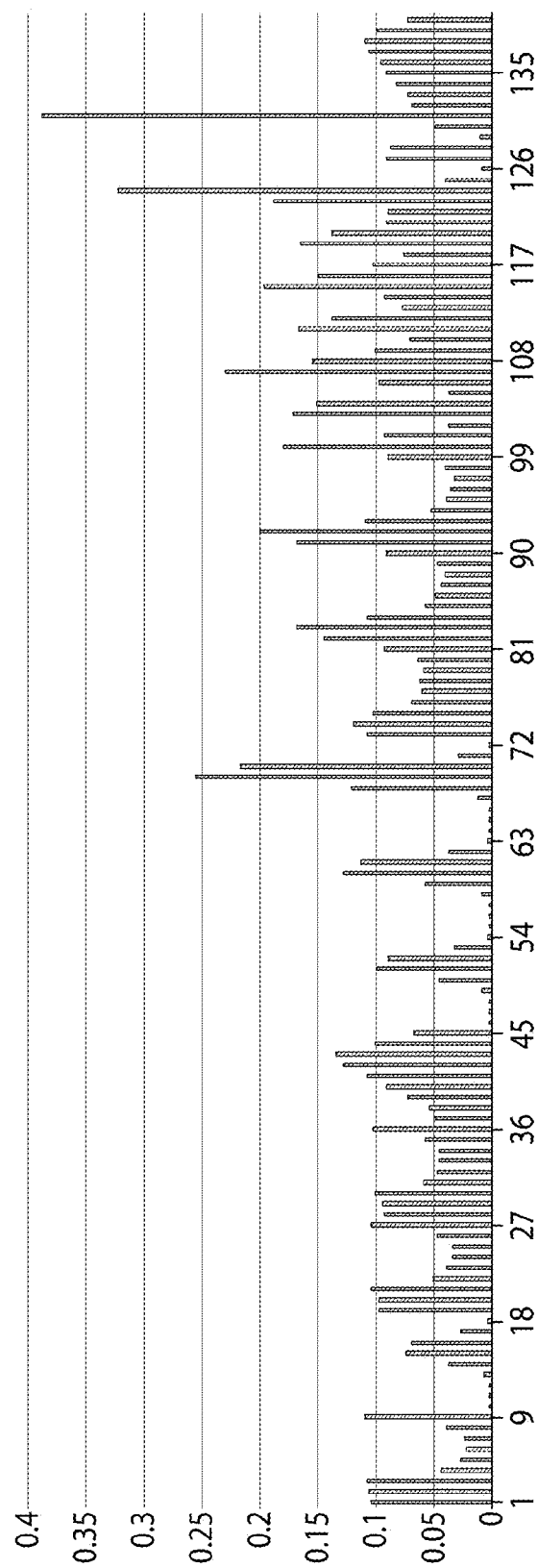
FIG. 16 shows an integrated multi-scale feature of a tumor OCM image including LBP, ALBP, and BLBP features.

LBP and its new ALBP and BLBP variants with different radius parameters can be used as features to capture the characteristics of texture patterns at different scales. A multi-scale feature is constructed by integrating LBP, ALBP and BLBP features obtained with different radius parameters. FIG. 16 shows an integrated multi-scale feature of a tumor OCM image comprising: dimension 1-9: $LBP_{8,2}^{riu2}$, dimension 10-18: $LBP_{8,8}^{riu2}$, dimension 19-27: $LBP_{8,4}^{riu2}$, dimension 28-36: $LBP_{8,2}^{riu2}$, dimension 37-45: $ALBP_{8,16}^{riu2}$, dimension 46-54: $ALBP_{8,8}^{riu2}$, dimension 55-63: $ALBP_{8,4}^{riu2}$, dimension 64-72: $ALBP_{8,2}^{riu2}$, dimension 73-81: $SBLBP_{8,3}^{riu2}$, dimension 82-90: $SBLBP_{8,6}^{riu2}$, dimension 91-99: $SBLBP_{8,12}^{riu2}$, dimension 100-108: $SBLBP_{8,18}^{riu2}$, dimension 109-116: $RBLBP_{8,1,3}$, dimension 117-124: $RBLBP_{8,2,3}$, dimension 125-132: $RBLBP_{8,4,3}$, dimension 133-140: $RBLBP_{8,6,3}$.

In order to increase the speed of the classification algorithm, attribute selection can be performed before classification is carried out based on the extracted features. In attribute selection step, attributes that can represent distinctive characteristics of different types of tissues should be kept, while less relevant attributes are eliminated, in order to lower the dimension of the feature vector. After attribute selection, computation complexity will reduce for both training and testing phases, while classification accuracy remains at a high level.

Figure 13:
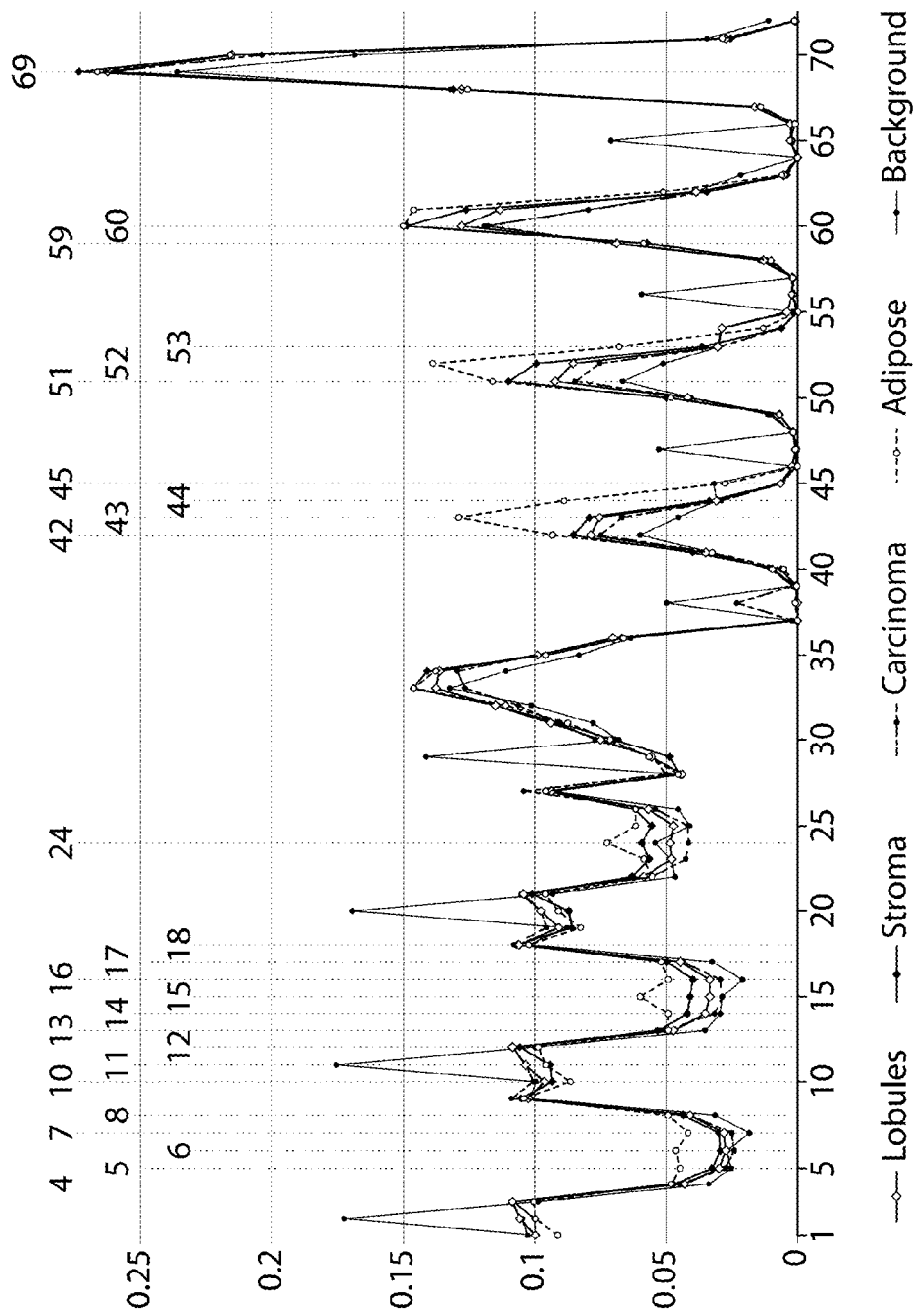
FIG. 13 shows the integrated multi-dimensional features as line graph of four different types of tissues and the background.

Attribute selection consists of two parts: a search method which extracts a new subset of attributes from the original attribute space, and an evaluation method which assigns a score to different attribute subsets. Commonly used search methods include greedy forward selection, simulated annealing, genetic algorithm, among others. Commonly used evaluation methods include information gain, chi-squared, among others. In the present invention, a genetic algorithm may be used as the search method and information gain as the evaluation method to achieve efficient and accurate attribute subset selection. For the integrated feature shown in FIG. 10B, we selected 14 attributes from all the 18 attributes. This feature dimension reduction keeps the classification accuracy level and reduces the classification time by 15%. We also perform attribute selection on the integrated multi-dimensional features (last column of Table III). We reduce the number of dimensions of features from 72 to 24. The running time of the algorithm reduces to 14.8%, while the classification accuracy decreases from 90.2% to 87.0%. FIG. 13 shows integrated multi-dimensional features (shown as line graph) of four different types of tissues and the background. The top 24 features (marked in bottom axis by squares) are selected from the integrated features. Fifteen of the selected features are from LBP features, while other 9 selected features are from ALBP features. The different lines in the graph each represent a different type or class of tissue (in this graph adipose tissue, fibrous stroma, breast lobules, carcinomas, and background).

Image Classification

Different classification methods are used to classify the OCM images based on the selected image feature subsets. The classification results of each classifier are evaluated by comparing to ground truth class labels obtained from histology images. Typical methods that may be used include k-nearest neighbors, naive bayes, C4.5 decision trees, and neural network classifiers.

The k-nearest neighbors is an extensively studied classification method. It has promising performance in a variety of classification applications including image based classification. Since the features in this application are numeric features, Euclidean distance is used as the distance metric when constructing the k-nearest neighbors classification model. Naive bayes is a probabilistic classifier based on Bayes' theorem. C4.5 is an decision tree based classifier. It builds a predictive model which maps the feature value to an output class which the feature belongs. Neural networks is especially useful in applications that are hard to solve by rule-based classification methods, such as image classification. In one embodiment of the present invention, a three-layer neural network may be used as the classification model. Other methods, however, may be used.

The present computer-aided diagnostic system 100 and related processes implemented by computer system 120 used for tissue analysis and disease detection will now be described in further detail.

Figure 2:
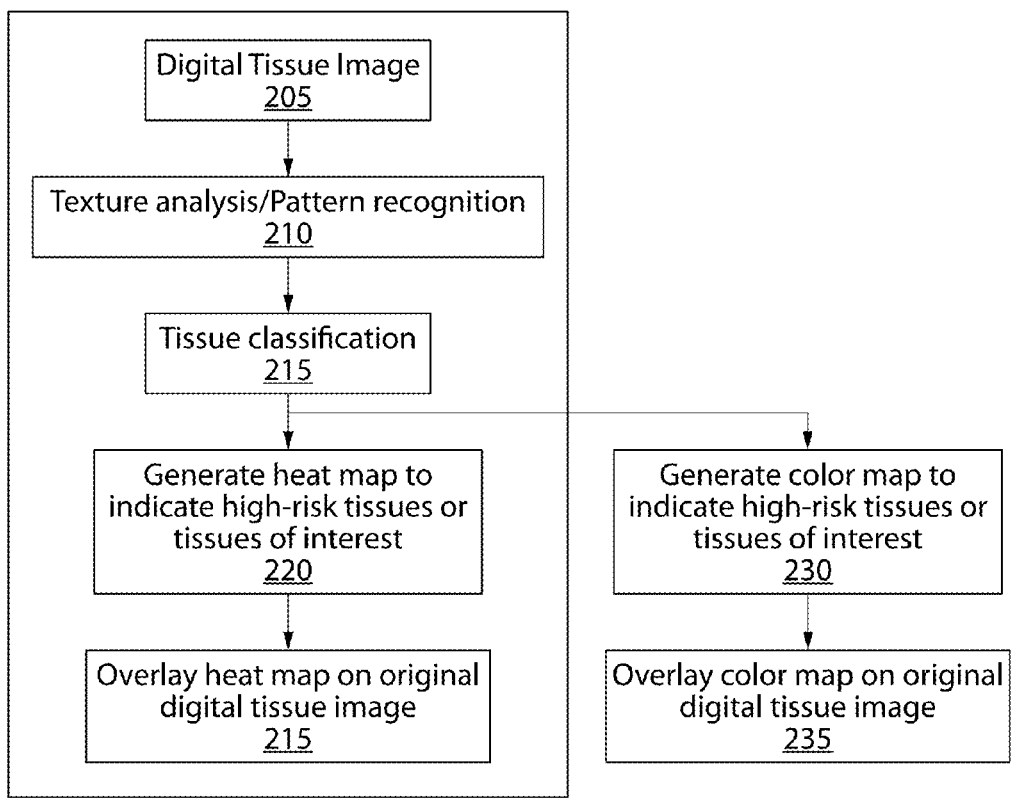
FIG. 2 is a flow chart summarizing the texture analysis based method or process performed by the system of FIG. 1 to classify and display tissue types.

FIG. 2 is a high-level flow chart of an exemplary computer-based method or process 200 for analyzing biological tissue samples using the present diagnostic system of FIG. 1. The steps may be performed in the same order shown or in a different order and may include less steps, different steps, or additional steps. Various steps may contain substrate-steps or sub-routines as further described herein.

Referring to FIG. 2, process 200 begins in step 205 by capturing an original image from a tissue sample using imaging device 110. The tissue image may be a pixelated digital image captured by OCM, OCT, confocal microscopy, or two photon microscopy in some embodiments. The image data is transmitted to and received by the computer system 120 for processing (see, e.g. FIG. 1). In step 210, the processor 122 performs texture analysis and pattern recognition analysis of the received tissue image by executing the control logic steps of the program software or instructions programmed into the computer system 120. In step 215, the processor 122 classifies the types of tissues found in the original tissue image. In step 220, the processor 122 generates a heat map which visually indicates or displays the tissue types of interest or medically suspect high-risk tissues. In step 225, the processor 122 overlays the heat map onto the original tissue image to form a composite image that is digitally enhanced in a manner which visually highlights the tissue types of interest or medical high-risk tissues. In one embodiment, the tissues of interest or high-risk tissues may appear darker than other tissues which are not of interest to the inquiry.

In an alternate or parallel process in step 230, the processor 122 generates a multiclass map showing all of the different tissue types and respective regions present in the original tissue image. In various embodiments, the map may be colored, gray scale, patterned, or combinations thereof with each tissue type found represented in various regions/locations by a visually distinct color, shading, and/or pattern. In step 235, the processor 122 overlays the multiclass tissue map onto the original tissue image to form a composite image that is digitally enhanced. This map is useful to quickly identify all of the different tissue types/structures found in the image sample. The various foregoing steps in process 200 will be further described herein.

Training Process

In order for the computer-aided diagnostic system 100 to accurately identify and classify tissue structures present in the image sample, a machine learning technique is used to program computer system 120, and more specifically to train an artificial neural network classifier of the system. Neural network classifiers are known in the art and described in U.S. Pat. No. 5,262,871, which is incorporated herein by reference in its entirety. Neural network classifiers comprise a software routine which builds a computational model based on image training inputs (e.g. histology images) that allows the computer system to identify different tissue types.

Figure 3:
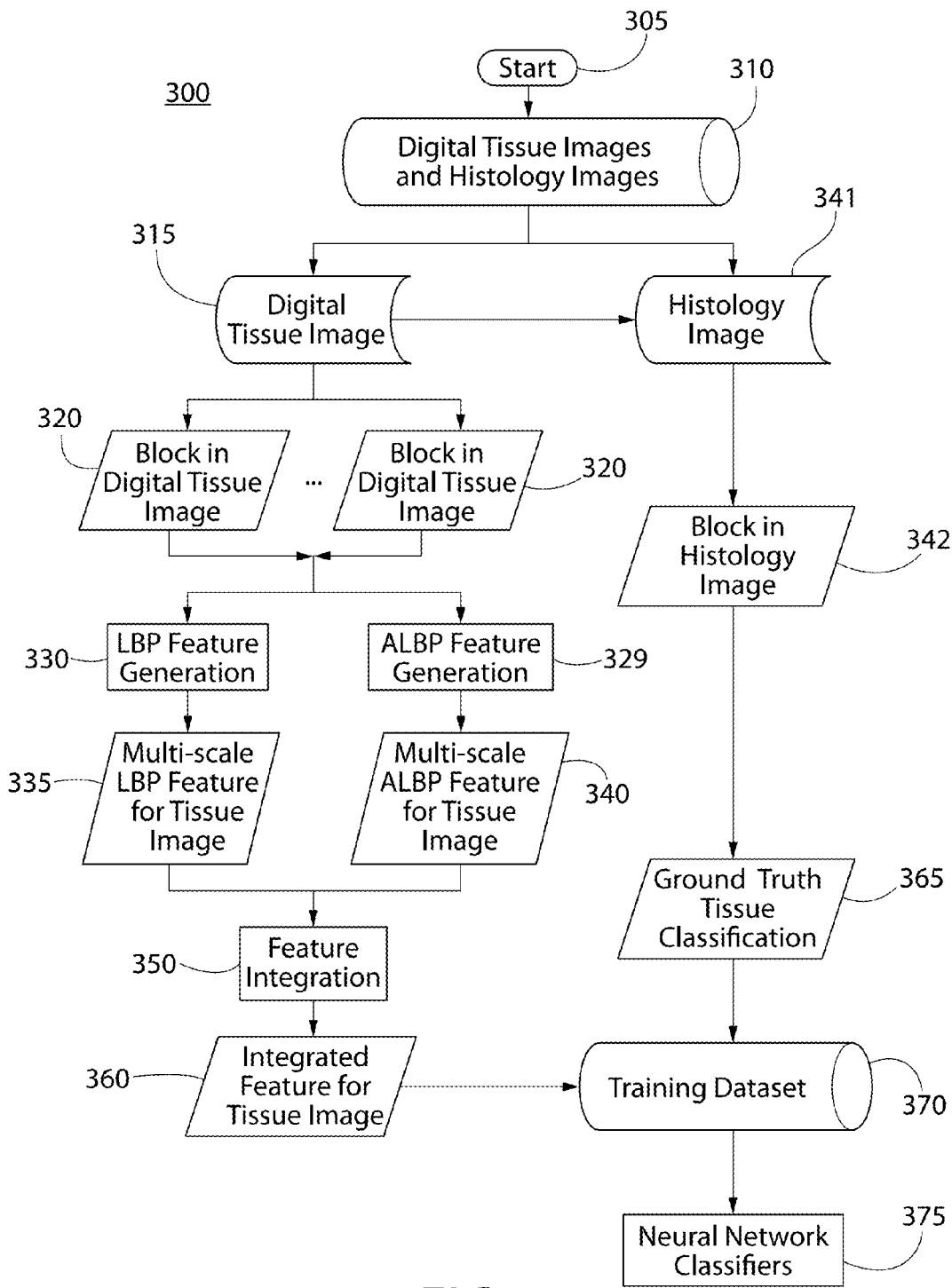
FIG. 3 is a flow chart showing a training process or method implemented by the present system for training a neural network classifier.

FIG. 3 is a flowchart showing an exemplary training method or process 300 that may be used to implement a learning algorithm which teaches the neural network tissue classifier implemented by computer system 120 to discern and identify different tissue types found in the original tissue sample image on a contextual basis. For example, if the tissue under investigation is breast tissue, the types of tissue found which can be used to program and train the processor 122 may be for example without limitation one of five different classes: adipose tissue, fibrous stroma, breast lobules, carcinomas, and background. Blocks of different classes show distinctive texture patterns in the OCM images which is used as a clue for tissue classification. The training process 300 may thus be considered an imaging preprocess which trains the neural network classifier. Additional reference is made to FIG. 4 which portrays portions of the training method in a graphical manner.

Figure 4:
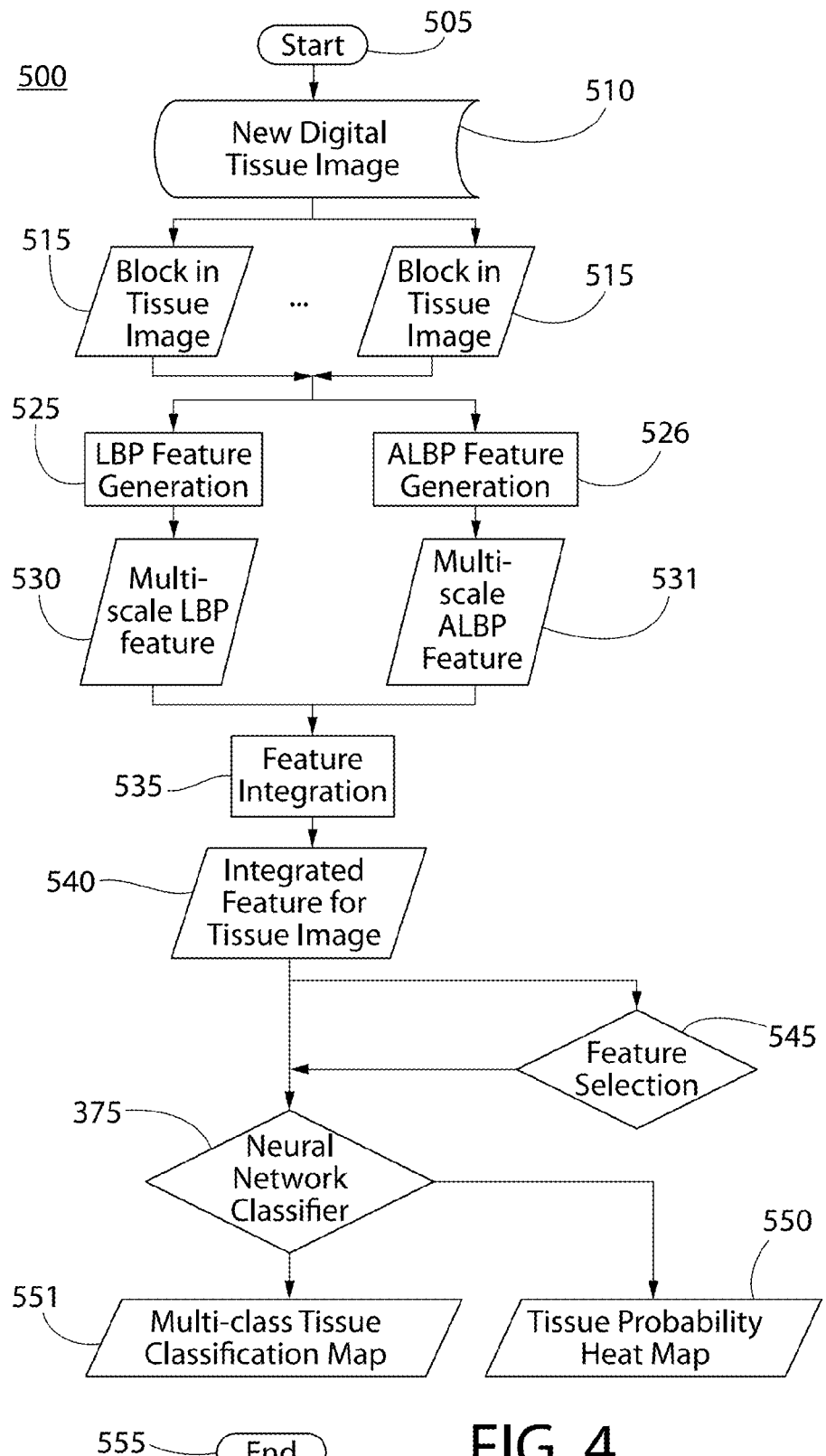
FIG. 4 is a flow chart showing a testing process or method implemented by the present system for analyzing biological tissue specimens.

Referring to FIGS. 3 and 4, the training process 300 is started in step 305. The processor 122, executing the software computer program instructions, first accesses a database in step 310 accessible to the computer system 120 which contains the original digital tissue image 401 and corresponding contextual histology tissue images 403 relevant to investigating breast tissue. The database may be populated with histology tissue images in advance of the training method or process 300 from any available source via data downloaded to computer system 120 which stores the images. The database may reside on computer readable medium 124 (including system or removable memory) or another external database which is accessible to processor 122. The digital tissue images downloaded from the imaging device 110 may be stored in the same or a different database or memory as the histology images. In one non-limiting example, ex vivo human breast tissue OCM images may be used.

In step 315, the digital tissue image is retrieved from the database by processor 122. In step 320, the original digital tissue image 401 is divided into a plurality of smaller tissue blocks or simply tissue blocks 402 (see, e.g. FIG. 4) having a size less than the complete original tissue image. Any suitable block size may be used. In one embodiment, the tissue blocks 402 may be all be of the same uniform size. To illustrate this step, in some representative non-limiting configurations of the software, an original image measuring 10,000×10,000 pixels may be split by processor 122 into a plurality of tissue blocks each measuring 400×400 pixels or 500×500 pixels. Other size tissue blocks may be used.

For each tissue block 402, the processor 122 then runs a parallel set of tissue texture analysis using LBP (local binary pattern), ALBP (average local binary pattern), and BLBP (block-based local binary pattern) to generate features. The LBP feature generation is shown in step 330. For each tissue block 402, LBP extraction is performed using the methodology and algorithms described herein to obtain a LBP feature having a LBP pattern which is represented by a binary number string (see, e.g. FIG. 9).

The ALBP feature generation is shown in step 329. For each tissue block 402, ALBP extraction is performed using the novel methodology and algorithms described herein to obtain an ALBP feature having an ALBP pattern which is represented by a binary number string (see, e.g. FIG. 9). The end result of the feature extraction process is that each tissue block 402 is represented by a pair comprising an LBP feature with an associated pattern characterized by binary numbers (step/block 335) and a corresponding ALBP feature with an associated pattern characterized by binary numbers (step/block 340). The integrated pair of LBP and ALBP features for a lobule and a fat tissue block 402 is shown in FIG. 10B (previously described herein). In one embodiment, a series of LBP and ALBP extractions and pattern generation may be run simultaneously in parallel by processor 122 for all of the tissue blocks 402, thereby expediting the processing time.

Figure 18:
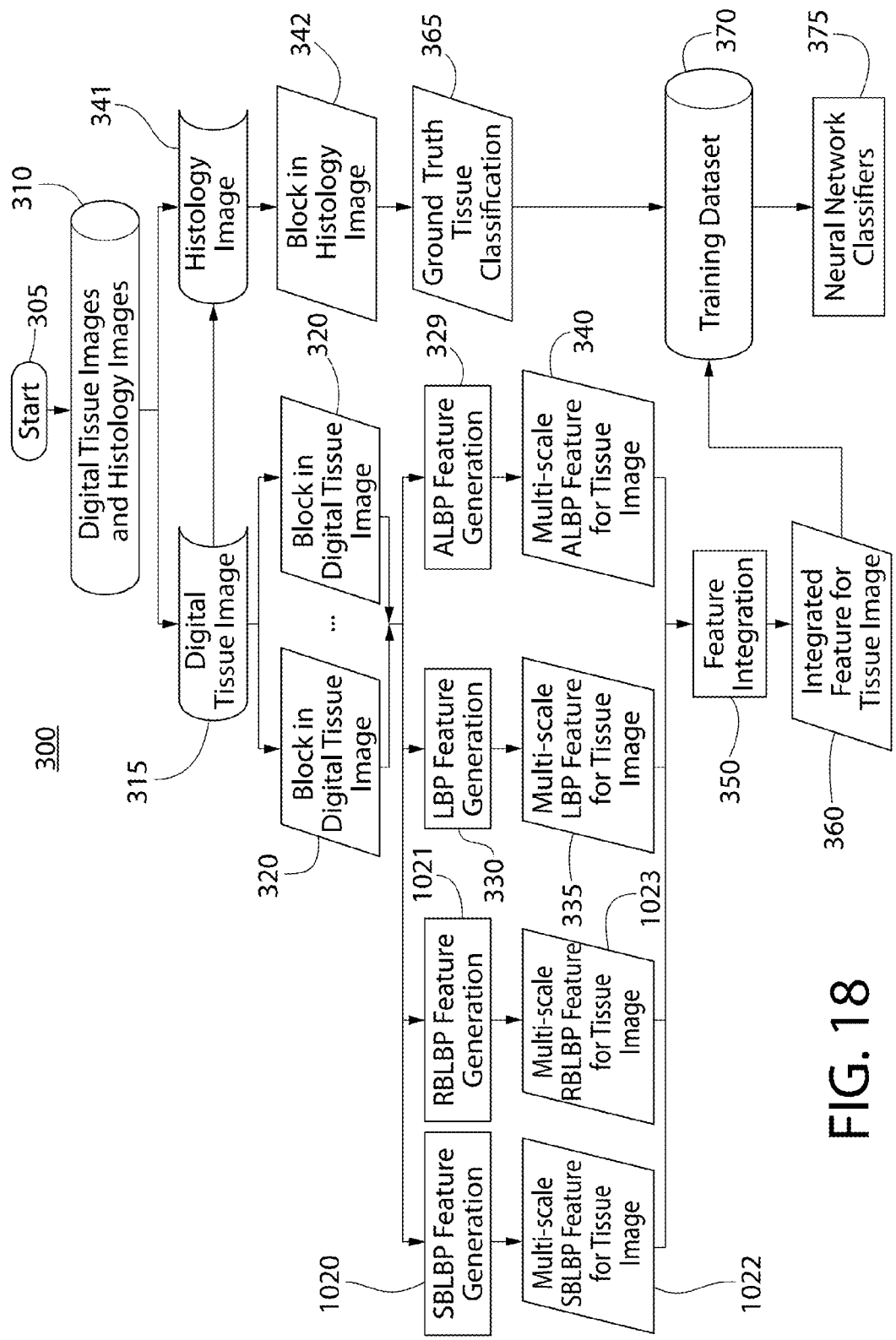
FIG. 18 is a flow chart showing a training process or method implemented by the present system for training a neural network classifier including LBP, ABLP, and BLBP features.

For alternative embodiments combining BLBP (block-based local binary pattern) features with ALBP features, the additional steps shown in FIG. 18 are added to the process flow. The SBLBP (Spoke-shaped) feature generation is shown in step 1020 and RBLBP (Ring-shaped) feature generation is shown in step 1021. For each tissue block 402, SBLBP and RBLBP extraction is performed using the novel methodology and algorithms described herein to obtain a SBLBP feature having an SBLBP pattern and a RBLBP feature having a RBLBP pattern, each of which is represented by a binary number string analogous for example to the ALBP binary number strings shown in FIG. 9 (lower images). The end result of this alternative feature extraction process is that each tissue block 402 is represented by an LBP feature with an associated pattern characterized by binary numbers (step/block 335), an ALBP feature with an associated pattern characterized by binary numbers (step/block 340), an SBLBP feature with an associated pattern characterized by binary numbers (step/block 1022), and an RBLBP feature with an associated pattern characterized by binary numbers (step/block 1023). The integrated LBP and ALBP features for a lobule and a fat tissue block 402 (see, e.g. FIG. 10B previously described herein) are combined with the integrated SBLBP and RBLBP features for the same tissue blocks (see, e.g. 15) which is representative of the tissue block 402 processed. In one embodiment, a series of LBP, ALBP, SBLBP, and RBLBP extractions and pattern generation may be run simultaneously in parallel by processor 122 for all of the tissue blocks 402, thereby expediting the processing time.

In step 350, the computer system 120 compiles and integrates all of the LBP and ALBP features (and SBLBP AND RBLBP features in the alternative embodiment), and generates an integrated multi-scale feature of the original digital tissue image 401 in step 360. FIG. 12 shows a representative multi-scale feature (previously described herein). The result is output to a database in block 370 where a training dataset being built by the training process 300 is stored for use by the processor during testing the original digital tissue image. The training dataset is available to and retrievable by the computer system 120 for use by the neural network classifier module of the program instructions to classify the tissue types found in the original digital tissue image 401 as represented by step/block 375.

With continuing reference to FIG. 3, in step 341, processor 122 retrieves both histology images and the actual digital tissue images from the database represented by block 310. Histology images of the same human breast tissue are used for collecting the ground truth data. In some embodiments, this step is performed in parallel with digital tissue image processing steps to expedite processing time.

In step 365, ground truth tissue classification is performed by processor 122. Registration is performed on the digital tissue images and their corresponding histology images, so that every block 402 in the digital tissue image has its correspondence in a histology image block 404 (see also FIG. 7). Accordingly, this step is performed on an image block by image block basis. Different types of tissues show different features on the histology images. Based on these features, each histology image is assigned a class label manually such as by an experienced pathologist. Then each digital tissue image is assigned the same class label as its corresponding histology image.

In step 370, the results generated in step 365 is transmitted to and stored in the training dataset database 370 for retrieval and use by processor in executing the neural network classifier for classifying the tissue types found in original digital tissue image 401 (see, e.g. FIG. 4).

Testing Process

FIG. 4 is a flowchart showing the testing method or process 500 used to test or analyze the original digital tissue image. The process 500 relies on the classifier of computer system 120 trained by process 300. The initial portion of the process is similar to training process 300 and performs LBP and ALBP tissue extraction and feature analysis in parallel. It will be appreciated that in the alternative processes described above also integrating BLBP analysis and feature generation, additional steps 1010-1013 are executed by the processor as shown in the flowchart of FIG. 19 and further described below.

Figure 19:
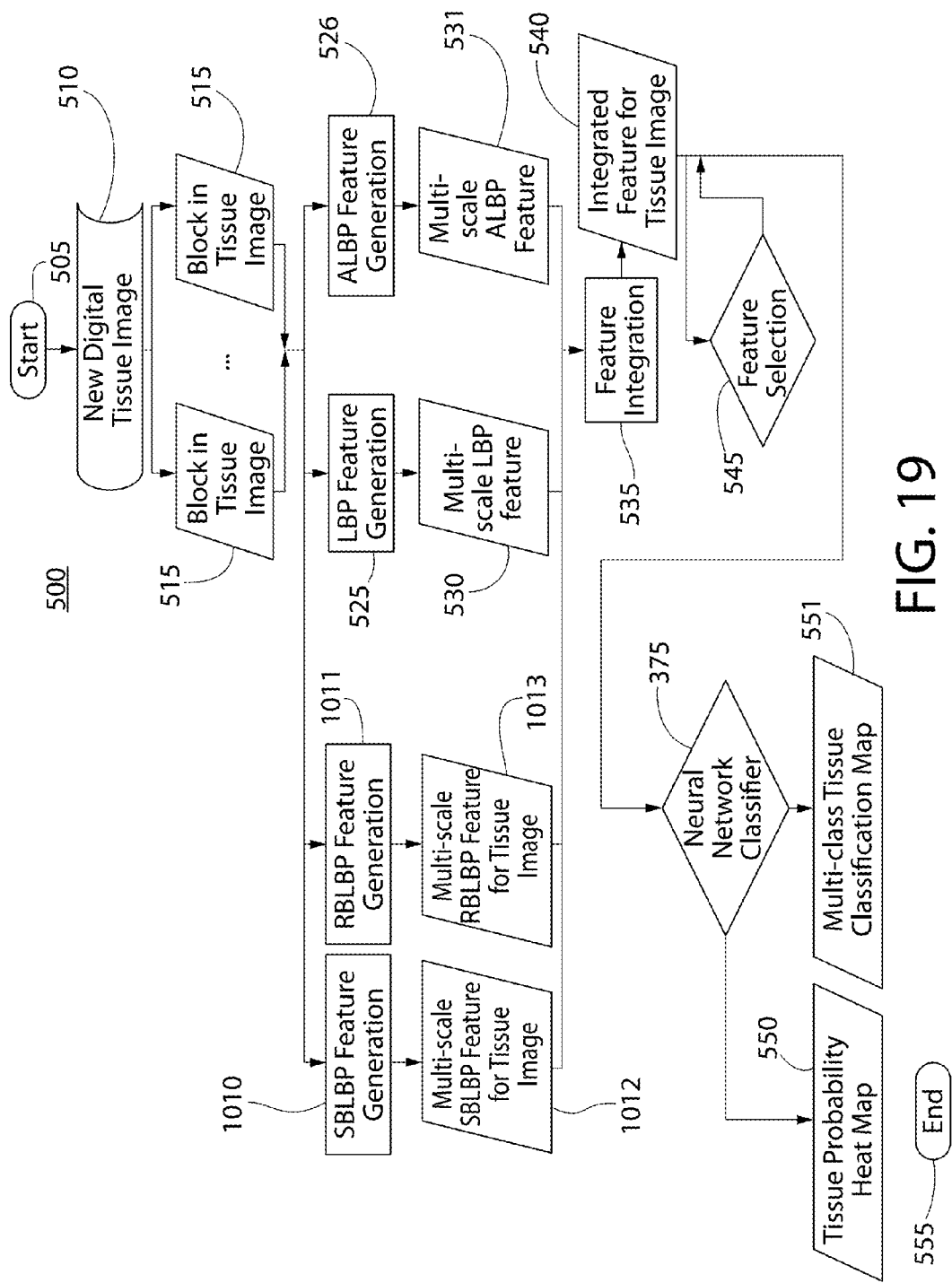
FIG. 19 is a flow chart showing a testing process or method implemented by the present system for analyzing biological tissue specimens using LBP, ABLP, and BLBP features.

In step 505, the process starts in both the ALBP and BLBP processes of FIGS. 4 and 19. In step 510, a new original digital tissue image 401 such as a breast OCM image is received by the processor 122 for analysis.

Subsequent steps 515 through 540 are essentially similar to steps 315 through 360 describe above with respect to testing process 300.

In step 515, the original digital tissue image 401 is divided into a plurality of smaller tissue blocks 402 (see, e.g. FIG. 4) having a size less than the complete original tissue image. These blocks are used to classify different areas of the digital tissue image into different types of tissue. In one exemplary embodiment, for the purpose of testing, the digital tissue images may be divided into two different sizes. In one implementation, the digital tissue images may be divided into tissue blocks 402 having the same size as in the training process (see also FIG. 3). In another embodiment, the digital tissue images may be divided into different size tissue blocks for testing than for training. Using different size avoids generating the same tissue blocks in the training process, thus increasing the reliability of the testing results.

For each tissue block 402, the processor 122 then runs a parallel set of tissue texture analysis using both LBP (local binary pattern) and ALBP (average local binary pattern) to generate features. The LBP feature generation is shown in step 525. For each tissue block 402, LBP extraction is performed using the methodology and algorithms described herein to obtain a LBP feature having a LBP pattern which is represented by a binary number string (see, e.g. FIG. 9).

The ALBP feature generation is shown in step 526. For each tissue block 402, ALBP extraction is performed using the novel methodology and algorithms described herein to obtain an ALBP feature having an ALBP pattern which is represented by a binary number string (see, e.g. FIG. 9). The end result of the feature extraction process is that each tissue block 402 is represented by a pair comprising an LBP feature with an associated pattern characterized by binary numbers (step/block 530) and a corresponding ALBP feature with an associated pattern characterized by binary numbers (step/block 531). The integrated pair of LBP and ALBP features for a lobule and a fat tissue block 402 is shown in FIG. 10B (previously described herein). In one embodiment, a series of LBP and ALBP extractions and pattern generation may be run simultaneously in parallel by processor 122 for all of the tissue blocks 402, thereby expediting the processing time.

For alternative embodiments combining BLBP (block-based local binary pattern) features with ALBP features, the additional steps shown in FIG. 19 are added to the process flow. The SBLBP (Spoke-shaped) feature generation is shown in step 1010 and RBLBP (Ring-shaped) feature generation is shown in step 1011. For each tissue block 402, SBLBP and RBLBP extraction is performed using the novel methodology and algorithms described herein to obtain an SBLBP feature having a SBLBP pattern and a RBLBP feature having a RBLBP pattern, each of which is represented by a binary number string analogous for example to the ALBP binary number strings shown in FIG. 9 (lower images). The end result of this alternative feature extraction process is that each tissue block 402 is represented by an LBP feature with an associated pattern characterized by binary numbers (step/block 335), an ALBP feature with an associated pattern characterized by binary numbers (step/block 340), an SBLBP feature with an associated pattern characterized by binary numbers (step/block 1012), and an RBLBP feature with an associated pattern characterized by binary numbers (step/block 1013). The integrated LBP and ALBP features for a lobule and a fat tissue block 402 (see, e.g. FIG. 10B previously described herein) are combined with the integrated SBLBP and RBLBP features for the same tissue blocks (see, e.g. 15) which is representative of the tissue block 402 processed. In one embodiment, a series of LBP, ALBP, SBLBP, and RBLBP extractions and pattern generation may be run simultaneously in parallel by processor 122 for all of the tissue blocks 402, thereby expediting the processing time.

In step 535, the computer system 120 compiles and integrates all of the LBP and ALBP features, and generates an integrated multi-scale feature of the original digital tissue image 401 in step 540. FIG. 12 shows a representative integrated multi-scale feature (previously described herein).

In the BLBP process of FIG. 19, the computer system 120 compiles and integrates all of the LBP, ALBP, SBLBP, and RBLBP features, and generates an integrated multi-scale feature in step 540 comprising all of these features.

In step 545, the feature or attribute selection phase already described herein is performed in which the most representative attributes in the integrated feature are selected for the neural network classifier to increase the processing speed of the classification algorithm.

In step 375, the pre-trained neural network classifier identifies each of the different tissue types or classes found in the original digital tissue image 401 based on the previous LBP and ALBP (and BLBP in some embodiments) feature extraction process integrated results. The neural network classifier, using the training dataset of images from database 370, operates to classify each of the tissue types in the original digital tissue image according to pre-assigned labels for each type from the training process 300. In this example of investigating breast tissue for cancer detection, the tissue types/classes are tumor, fat, stroma, lobule, and background tissue not belonging to the other tissue classes.

The process continues with the neural network classifier then generating a heat map identifying the presence and extent of a tissue of interest (e.g. a carcinoma) in step 550 and/or generating a multi-class tissue classification map in step 551 showing all tissue types present, as further described herein. The process then ends in step 555 and may be repeated for the next tissue image to be analyzed.

It will be appreciated that in some other processes possible, SBLBP or RBLBP feature generation may be used alone in the training and testing processes of FIGS. 18 and 19. Accordingly, both SBLBP and RBLBP need not be performed in all embodiments.

Heat Map Generation

Figure 5:
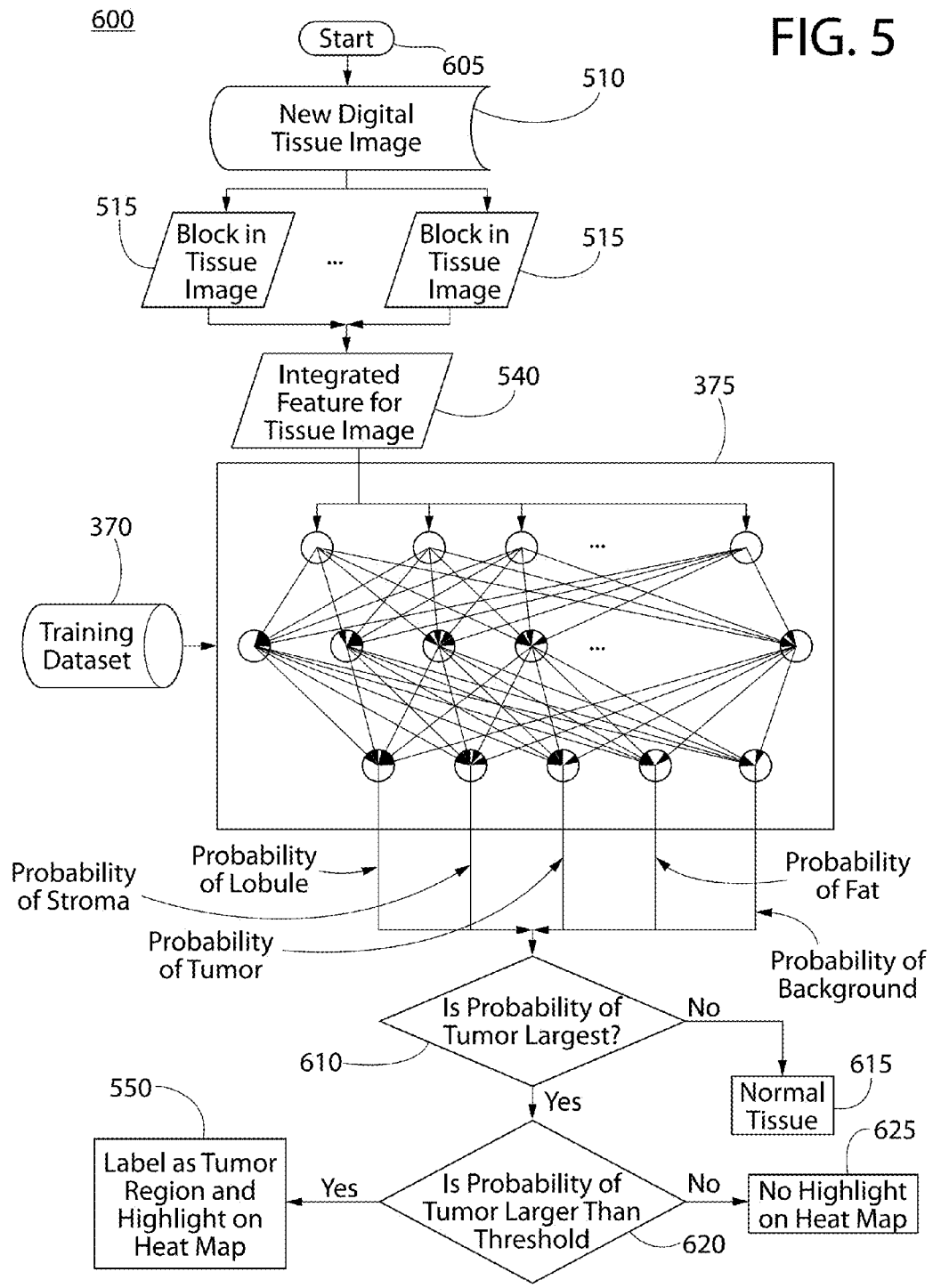
FIG. 5 is a flow chart showing a heat map generation and display process or method implemented by the present system for displaying a tissue of interest such as a carcinoma.

FIG. 5 is a flowchart showing an exemplary method or process 600 (e.g. sub-routine) performed by computer system 120 for generating displaying the heat map shown in block 550 of FIG. 4. The heat map identifies and highlights in a readily discernible visual manner the presence of the primary tissue of interest to the investigation (e.g. a carcinoma for cancer detection) in the original digital tissue image 401. The process for generating the heat map begins in step 605. The preliminary processing steps of the testing process 500 are summarized in FIG. 5 for brevity as being represented by steps/blocks 510, 515, 540 and 375 with interim steps not repeated.

In step 375, the neural network classifier predicts the probability of the presence of each type or class of tissue for each tissue block image from the original tissue image. In this example of investigating breast tissue for cancer detection, the tissue types/classes may be tumor (carcinomas), fat, stroma, lobule, and background tissue. In decision step 610, the neural network classifier determines, for each tissue block image, if the probability is the largest that the tissue in the image is a tumor. If a "No" response is returned, then the tissue is classified as "normal" in step 615 and that tissue block image will not be displayed in a digitally enhanced manner (e.g. colored) in the heat map overlaid onto the original tissue image 401.

If a "Yes" is returned instead in decision step 610, control passes to decision step 620 in which the neural network classifier then determines if the probability of a tumor is larger than a preprogrammed threshold value in step 620. By setting a threshold Θ to the output value that corresponds to the tissue type of carcinoma for example, the tissue blocks in the digital tissue image which represent tumor regions may be obtained and displayed. If a digital tissue image contains blocks that are classified as tumor tissue, the whole digital tissue image is classified as tumor; otherwise, the whole digital tissue image is classified as benign.

Figure 17:
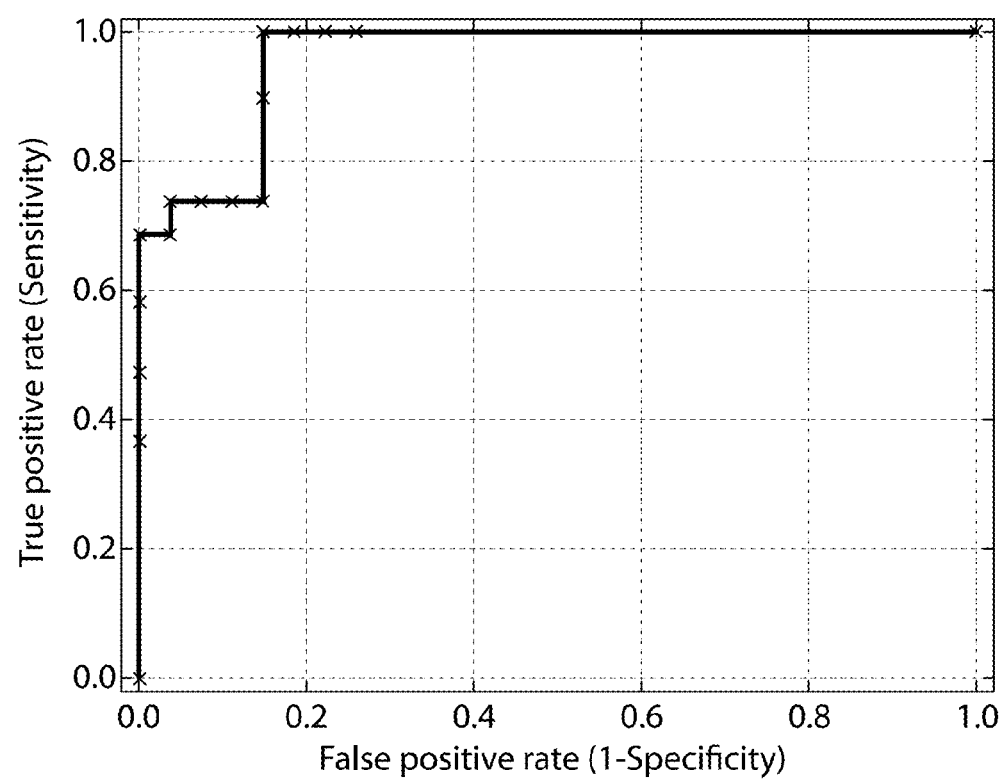
FIG. 17 is a receiver operating characteristic curve (ROC) for the system's tissue classification results.

To improve robustness of the algorithm, any isolated block less than 0.4 mm×0.4 mm in physical size in one non-limiting example that is classified as Carcinoma is considered as noise and not taken into account during image classification. Further, since the areas in the OCM image that represent regions of cancerous tissue (i.e. Carcinoma) are determined by setting a threshold θ to the output value corresponding to Carcinoma in the neural network classifier, we can obtain a receiver operating characteristic (ROC) curve by adjusting the threshold value θ, see FIG. 17. The ROC curve can be used to characterize the performance of the large-field OCM image classification algorithm using the multi-scale integrated texture feature. The area under curve (AUC) value is found to be 0.959. The best classification accuracy is obtained at a specificity level of 85.2% and sensitivity level of 100% (marked by red circle in FIG. 17). For comparison, the classification accuracies using different texture features are shown in the table below. The best performance is achieved using the integrated feature, as well as MBLBP feature, on the two-class large-field OCM image classification task.

| | | Feature Type | | | | |
|---|---|---|---|---|---|---|
| | | Integrated | MBLBP | MALBP | LBP | CLBP |
| Images | Containing Tumor | 100 | 100 | 94.7 | 57.9 | 73.7 |
| | All Benign | 85.2 | 85.2 | 85.2 | 74.1 | 81.5 |
| | Overall Accuracy | 91.3 | 91.3 | 89.1 | 67.4 | 78.2 |

With continuing reference to FIG. 5, if a "Yes" is returned in step 620, the neural network classifier labels the tissue block as a tumor region and generates a heat map in step 550 highlighting the tumor tissue blocks and regions they occupy in a visually discernible manner. The heat map showing the tumor region is overlaid onto the original digital tissue tissue image, thereby created a digitally enhanced tissue image to advantageously facilitate review by a health care professional. The results are shown in the heat map of FIG. 11B. The grayscale original tissue image without enhancement by the heat map is shown in FIG. 11A for comparison.

It should be noted that the foregoing process is performed for each tissue image block 401 to determine whether each block is a carcinoma which is displayed in a highlighted manner on the heat map.

In one embodiment, the tumor regions in the heat map are highlighted in the image displayed by computer system 120 on visual display device 128 as a colorized and/or darker region on top of the grayscale original tissue image 401. For each tissue block determined to be a tumor, a color is overlaid onto that tissue block in the original grayscale tissue image output and displayed by the computer system 120. The color may appear as entirely opaque in the digitally enhanced tissue image in some embodiments, and in other embodiments may be translucent to allow the original tissue structure to show through the color. Groups of colorized tissue blocks will form colorized regions of tumor tissue in the digitally enhanced version of the original tissue image.

It will be appreciated that the tumor region may be displayed in other visually discernible ways by system 120 and is not limited to the non-limiting examples described herein. Advantageously, the heat map allows the health care professional to quickly detect in a visual manner if a suspected tumor region with significant probability of being cancerous has been found by the testing for further medical investigation.

It should be noted that the processor 122 makes a determination for every single tissue block image whether the tissue found is classified as a tumor or normal. The digitally enhanced version of the original tissue image (collectively comprised of the plurality of individual tissue block images) displays each tissue block therefore as either grayscale (normal tissue) or colorized (tumor). If none of the tissue block images are classified by neural network classifier as a tumor, then no colorized heat map is produced in some embodiments and the entirety of the original tissue image appears in grayscale.

Multi-Class Tissue Classification Map

Figure 6:
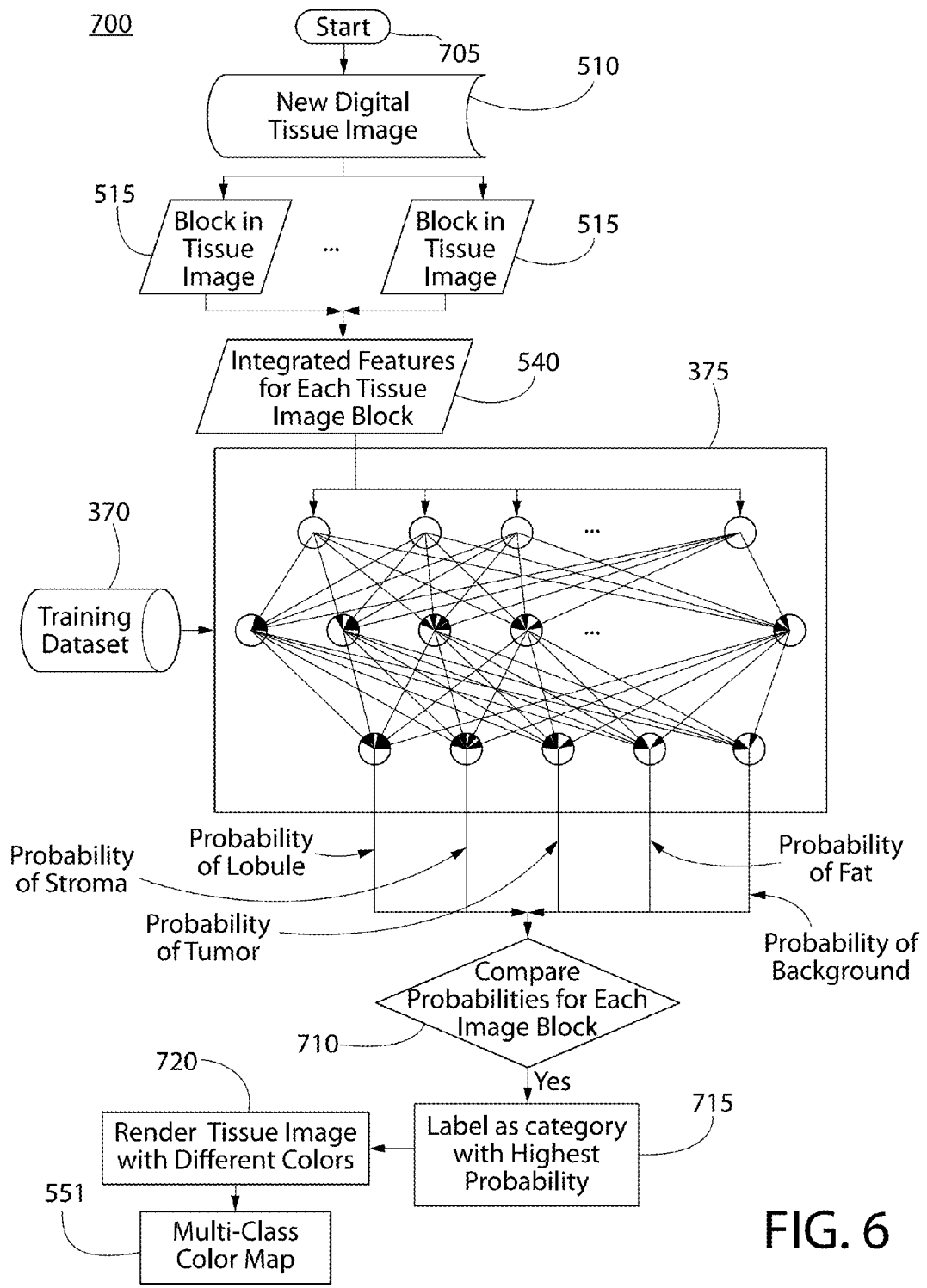
FIG. 6 is a flow chart showing a multi-class tissue classification map generation and display process or method implemented by the present system for displaying all types of tissue present in the specimen.

FIG. 6 is a flowchart showing an exemplary method or process 700 (i.e. sub-routine) performed by computer system 120 for generating and displaying the multi-class tissue classification map shown in block 551 of FIG. 4. The map shows all the different tissue types present in the original digital tissue image 401 in a readily discernible visual manner. The process begins in step 705. Similarly to FIG. 5, the preliminary processing steps of the testing process 500 are summarized in FIG. 5 for brevity as being represented by steps/blocks 510, 515, 540 and 375 with interim steps not repeated.

In step 375, the neural network classifier routine run by processor 122 predicts the probabilities for each type of tissue (from the preprogrammed tissue types) in each tissue image block 402 of the original OCM tissue image 401. In this example of investigating breast tissue for cancer detection, the tissue types/classes used may be tumor, fat, stroma, lobule, and background tissue. For each image block 402, the neural network classifier generates a set of tissue type probabilities for the foregoing different types learned from the training process 300. In step 710, the processor 122 compares the tissue type probabilities for each image block to determine which tissue type has the highest probability for each image block (i.e. which tissue type is most likely to be found in each image block). In step 715, the neural network classifier labels each tissue image block with the tissue type corresponding to the highest probability (i.e. tumor, fat, stroma, lobule, and background).

In step 720, the tissue type of each tissue image block 402 of the original digital tissue image is rendered in a different visually discernible manner on display device 128 of computer system 120. For each image block, the system 120 may render each tissue type in various different predetermined visual manners so that different tissue types may be readily distinguished. In one embodiment, regions of different tissue types/classes may be graphically rendered and displayed in different colors and/or patterns. An exemplary multi-class tissue classification is shown in FIG. 11C in which the different tissue types are shown in different patterns and colors (not evident in the black and white figure). A key may be generated and displayed by computer system 120 showing the different colors/patterns assigned to each tissue label. Tumor regions may be shown in a darker and/or different color than other tissue regions to emphasis this tissue of interest.

In step 551, a digitally enhanced version of the entire original tissue image 401 is displayed collectively showing each tissue image block in its corresponding color/pattern.

Figure 7:
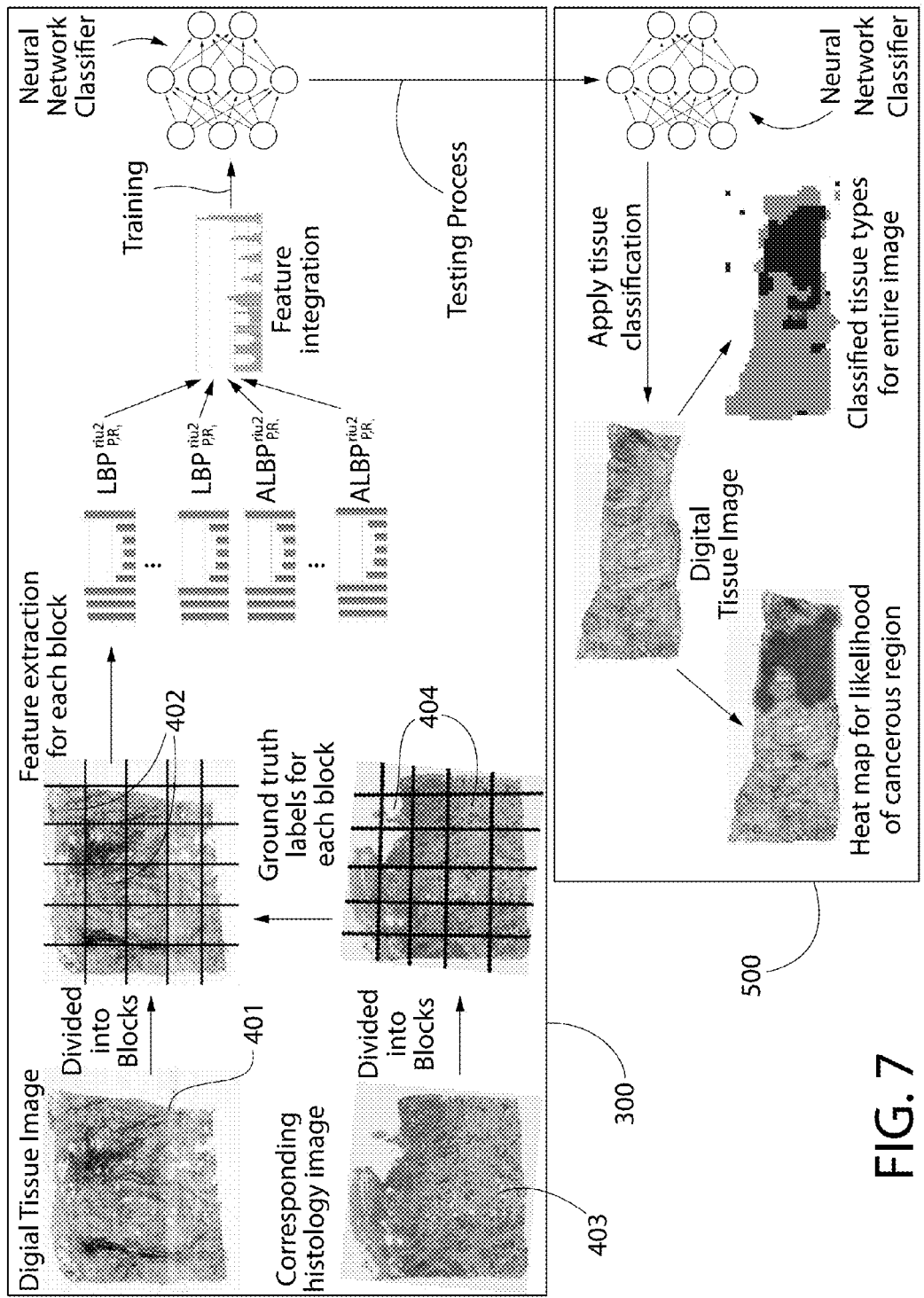
FIG. 7 is a chart summarizing the foregoing processes.

FIG. 7 summarizes and illustrates the methodology for each of the foregoing training, testing, heat map generation, and color map generation processes performed by computer-aided diagnostic system 100 at a higher level of abstraction in a graphical manner. This figure therefore summarizes the major process steps performed by computer system 120 described above with respect to FIGS. 3-6.

Experimental Test

In one configuration and test of the present invention, a high speed OCM system was used to image freshly excised human breast tissue based on time domain detection techniques. The setup included a femtosecond Nd:Glass laser was spectrally broadened to generate an output spectrum centered at 1060 nm with a broad spectrum bandwidth of ~200 nm, providing an axial resolution of less than 4 µm. A 40× water immersion IR-Achroplan objective (e.g. Carl Zeiss Co.) was used to provide OCM images with a transverse resolution of ~2 µm. Individual OCM image covering an imaging area of 500 µm×400 µm was acquired at a frame rate of 2 frames per second. A high precision three-dimensional translational stage (e.g. Newport Inc.) was used allowing rapid adjustment of focus position inside the tissue and also the imaging area over the tissue surface. The entire surface of the breast tissue specimen was imaged by translating the specimen horizontally.

In this experiment, ex vivo human breast tissue OCM images were used. The images utilized in the experiments are en face OCM images which are contrast adjusted and displayed with an inverse grayscale color map. That means darker areas in OCM images represents increased reflectivity. These OCM images have axial resolution of 4 µm, and transverse resolution of 2 µm, respectively.

The OCM images were preprocessed for the purpose of training and testing. In the training process, each OCM image is divided into blocks of 500×500 pixels. Each block is used as an instance for the training. Each of the tissue blocks is labeled with one of the five different tissue classes: adipose tissue, fibrous stroma, breast lobules, carcinomas, and background. Blocks of different classes show distinctive texture patterns in the OCM images which is used as a clue for tissue classification.

Histology images of the same human breast tissue are used to help in collecting the ground truth data. It bears noting, however, that histology images themselves are not directly used or analyzed for classifying the tissue types found which is instead based on the original tissue image captured by the label free optical imaging device (e.g. OCM images). Registration is performed on the OCM images and their corresponding histology images, so that every block in the OCM image has its correspondence in the histology image. Different types of tissues show different features on the histology images. Based on these features, each histology image is assigned a class label manually by an experienced pathologist. Then each OCM image is assigned the same class label with its corresponding histology image. FIG. 7 shows the entire OCM image 401 and its corresponding histology image 403 of human breast tissue.

For the purpose of testing, OCM images are divided into two different sizes. In the 10 fold cross-validation test, the OCM images are divided into blocks of 500×500 pixels. It is the same size as in the training process. In another experiment, the OCM images are divided into blocks of 400×400 pixels. These blocks are used to classify different areas of the OCM image into different types of tissue. Different sizes are used in this experiment, in order to avoid generating the same tissue blocks in the training process, thus increasing the reliability of the experimental results.

In order to test and verify the performance of the present computer-aided diagnostic system 100 and integrated LBP/ALBP feature generated on classifying human tissue OCM images, classification on OCM image tissue blocks obtained from the image preprocessing step was performed. Tissue blocks were classified into five categories: lobule, stroma, carcinoma, adipose and background. In the experimental test, 4359 OCM image tissue blocks were used for the experiments (198 lobule, 2065 stroma, 1127 carcinoma, 347 adipose, 572 background). Classification was performed by using the neural network classifier.

The classification accuracy (%) using 10 fold cross-validation by using different features is shown in the table below:

| Features | Lobule | Stroma | Carcinoma | Adipose | Back-ground | Overall Accuracy |
|---|---|---|---|---|---|---|
| $LBP_{2,8}$ | 7.1 | 81.5 | 73.4 | 30.5 | 58.7 | 68.8 |
| $LBP_{4,8}$ | 23.2 | 82.2 | 75.7 | 69.2 | 77.1 | 76.1 |
| $LBP_{8,2}$ | 53.5 | 86.0 | 72.8 | 46.7 | 88.3 | 78.2 |
| $LBP_{8,4}$ | 39.9 | 86.3 | 77.7 | 79.5 | 87.4 | 81.6 |
| $LBP_{8,8}$ | 29.3 | 86.2 | 78.0 | 80.1 | 92.1 | 81.7 |
| $LBP_{8,16}$ | 25.3 | 81.6 | 60.5 | 69.7 | 87.6 | 73.4 |
| $LBP_{8,8}$, $ALBP_{8,8}$ | 31.8 | 86.9 | 79.8 | 87.9 | 97.7 | 84.0 |
| MLBP, MALBP | 61.1 | 92.3 | 85.4 | 94.2 | 99.3 | 90.2 |
| BLBP | 59.3 | 88.2 | 84.6 | 88.8 | 99.1 | 87.4 |
| MBLBP | 77.4 | 96.2 | 83.2 | 95.9 | 100 | 92.4 |
| Integrated | 68.3 | 94.0 | 93.5 | 97.1 | 100 | 93.8 |
| $LTP_{8,8}$ | 10.6 | 86.4 | 81.4 | 90.5 | 93.9 | 82.9 |
| CLBP | 57.3 | 89.6 | 73.8 | 81.8 | 99.0 | 84.6 |

The features shown in the above table are:

MLBP: multi-scale LBP ($LBP_{8,2}^{riu2}$+$LBP_{8,4}^{riu2}$+$LBP_{8,8}^{riu2}$+$LBP_{8,16}^{riu2}$)

MALBP: multi-scale ALBP ($ALBP_{8,2}^{riu2}$+$ALBP_{8,4}^{riu2}$+$ALBP_{8,8}^{riu2}$+$ALBP_{8,16}^{riu2}$)

CLBP: CLBP Sign+CLBP Magnitude+CLBP Center

BLBP: $SBLBP_{8,9}^{riu2}$+$RBLBP_{8,3,3}$

MBLBP: $SBLBP_{8,3}^{riu2}$+$SBLBP_{8,6}^{riu2}$+$SBLBP_{8,12}^{riu2}$+$SBLBP_{8,18}^{riu2}$+$RBLBP_{8,1,3}$+$RBLBP_{8,2,3}$+$RBLBP_{8,4,3}$+$RBLBP_{8,6,3}$ Integrated: MLBP+MALBP+MBLBP One can see that, the multi-scale integrated feature (MLBP+MALBP+MBLBP) gives the best result. Since the new ALBP and BLBP features are more robust to image noise and can extract richer, more distinctive information from images based on intensity variance, they demonstrated superior performance in distinguishing image blocks of different types of tissue, when integrated with original LBP. Using multi-scale features improves performance because OCM images of different tissue types exhibit different texture features at multiple scales. The classification performance was also compared using the new features with that of using the original LBP feature alone, the local ternary patterns (LTP) of other researchers (Tan and Triggs, 2007), and complete local binary patterns (CLBP) (Guo et al., 2010). The present results showed that multi-scale integrated features incorporating the newly proposed ALBP and BLBP features outperformed other features in distinguishing different types of breast tissue in OCM images.

Figure 20:
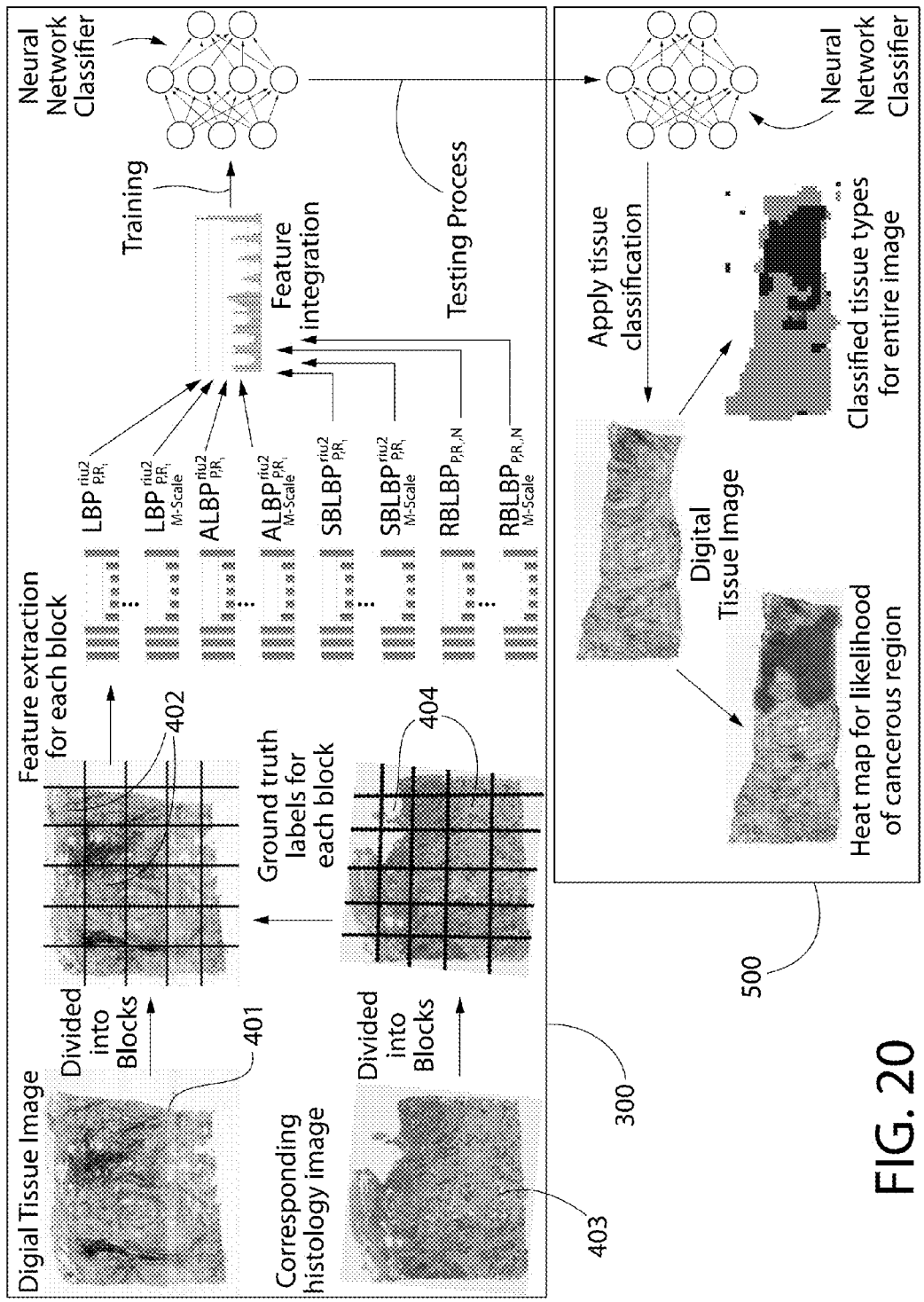
FIG. 20 is a chart summarizing the foregoing processes using LBP, ABLP, and BLBP features.

FIG. 20 summarizes and illustrates the methodology for each of the foregoing training, testing, heat map generation, and color map generation processes performed by computer-aided diagnostic system 100 at a higher level of abstraction in a graphical manner. This figure therefore summarizes the major process steps performed by computer system 120 described above utilizing texture analysis methods which comprise local binary pattern (LBP) extraction that generates a local binary pattern feature, average local binary pattern (ALBP) extraction that generates an average local binary pattern feature, and block based local binary pattern (BLBP) extraction that compares the average intensity value of pixels in blocks of certain shape in a neighborhood around the center pixel.

While the foregoing description and drawings represent exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A computer-aided diagnostic system for analyzing tissue image data, comprising:
    a non-transitory computer readable medium having software program instructions stored thereon;
    a computer processor communicating with the computer readable medium, the processor when configured with and executing the program instructions being operable to:
    receive an original tissue image captured by an optical imaging device, wherein the imaging device captures the original tissue image by optical coherence microscopy, optical coherence tomography, confocal microscopy, or two photon microscopy;
    divide the original tissue image into a plurality of smaller tissue blocks which collectively represent the captured original tissue image, each tissue block having a texture;
    analyze each tissue block based on its texture to classify a type of tissue found in each tissue block; and
    generate a digitally enhanced map overlaid on the original tissue image displaying a predetermined tissue type of interest in a visually discernible highlighted manner;
    wherein the processor is further operable to perform on each tissue block a combination of a plurality of texture analysis methods; and
    wherein the texture analysis methods comprise local binary pattern extraction that generates a local binary pattern feature, average local binary pattern extraction that generates an average local binary pattern feature, and block based local binary pattern extraction that compares the average intensity value of pixels in blocks of certain shape in a neighborhood around the center pixel to generate block based local binary pattern features.

2. The system according to claim 1, wherein the local binary pattern extraction, average local binary pattern extraction and block based local binary pattern extraction for each tissue block are performed in parallel by the processor.

3. The system according to claim 1, wherein the processor is further operable to integrate the local binary pattern feature, the average local binary pattern feature and block based local binary pattern features in each of the tissue blocks and generate a multi-class integrated feature for each tissue block.

4. The system according to claim 3, further comprising a neural network classifier implemented by the processor which is configured and operable to classify the type of tissue present in each tissue block based on its respective multi-class integrated feature.

5. The system according to claim 4, wherein the neural network classifier performs a tissue pattern recognition analysis on each of the tissue blocks to classify the types of tissues present by correlating the tissue patterns extracted from each tissue block with a predetermined training dataset of tissue patterns.

6. The system according to claim 3, wherein the processor is further operable to select attributes from the multi-class integrated feature of each tissue block that represent distinctive characteristics of different types of tissues and eliminate less relevant attributes.

7. The system according to claim 1, wherein the original tissue image is in grayscale and tissue of interest is colorized on the digitally enhanced map.

8. The system according to claim 1, further comprising the processor being operable to determine whether each tissue block contains the tissue of interest, wherein if the tissue block contains the tissue of interest a color overlay is displayed on the original tissue image for that tissue block, or else no color overlay is displayed on the original tissue image for that tissue block.

9. The system according to claim 1, wherein the processor is operable to determine a probability that the tissue type found in each tissue block is the tissue of interest, and only displays a color overlay if the probability that the tissue type found is the tissue of interest is larger than the tissue type found being another tissue type, or else no color overlay is displayed.

10. The system according to claim 1, wherein the tissue of interest is a tumor.

11. A computer-aided diagnostic system for analyzing tissue image data, comprising:
a non-transitory computer readable medium having software program instructions stored thereon;
a computer processor communicating with the computer readable medium, the processor when configured with and executing the program instructions being operable to:
receive an original tissue image captured by an optical imaging device, wherein the imaging device captures the original tissue image by optical coherence microscopy, optical coherence tomography, confocal microscopy, or two photon microscopy;
divide the original tissue image into a plurality of smaller tissue blocks which collectively represent the captured original tissue image, each tissue block having a texture;
perform on each tissue block a combination of a plurality of texture analysis methods comprising local binary pattern extraction that generates a local binary pattern feature, average local binary pattern extraction that generates an average local binary pattern feature, and block based local binary pattern extraction that compares the average intensity value of pixels in blocks of certain shape in a neighborhood around the center pixel to generate block based local binary pattern features;
classify a type of tissue based on the texture features extracted from each tissue block according to predefined types of contextually relevant tissues found in the original tissue image; and
display a digitally enhanced image of the original tissue image which shows at least one type of tissue in a visually discernible manner.

12. The system according to claim 11, wherein the processor is operable to generate a multi-class integrated feature for each tissue block comprising the local binary pattern feature, average local binary pattern feature, and block based local binary pattern features of each tissue block.

13. The system according to claim 11, wherein the processor is operable to classify the type of tissue found in each tissue block based on its respective multi-class integrated feature.

14. The system according to claim 11, wherein each tissue block in the digitally enhanced image appears in either grayscale or is overlaid with a color to connote a predetermined tissue type of interest.

15. The system according to claim 11, wherein the digitally enhanced image comprises multiple tissue types, each tissue type being displayed by the processor with a different visual appearance in the digitally enhanced image.

16. The system according to claim 14, wherein each tissue type displayed in the digitally enhanced image is a different color.

17. A computer aided diagnostic method for automatically classifying tissue types in a digital tissue image, the method implemented by a processor executing program instructions and comprising steps of:
receiving an original tissue image captured by an optical imaging device, wherein the imaging device captures the original tissue image by optical coherence microscopy, optical coherence tomography, confocal microscopy, or two photon microscopy;
dividing the original tissue image into a plurality of smaller tissue blocks which collectively represent the captured original tissue image, each tissue block having a texture;
performing on each tissue block a combination of a plurality of texture analysis methods comprising local binary pattern extraction that generates a local binary pattern feature, average local binary pattern extraction that generates an average local binary pattern feature, and block based local binary pattern extraction that compares the average intensity value of pixels in blocks of certain shape in a neighborhood around the center pixel to generate block based local binary pattern features;
classifying a type of tissue found in each tissue block based on its texture; and
displaying a digitally enhanced map of the original tissue image in which at least one tissue type is shown in a visually discernible manner from other portions of the original image.

18. The method according to claim 17, further comprising steps of the processor:

integrating the local binary pattern feature, average local binary pattern feature, and block based local binary pattern features for each of the tissue blocks; and generating a multi-class integrated feature for each of the tissue blocks comprising its respective local binary pattern feature and average local binary pattern feature.

19. The method according to claim 17, further comprising configuring the program instructions to form a neural network classifier implemented by the processor, the neural network classifier being operable to classify the type of tissue found in each tissue block from its respective multi-class integrated feature.

20. The method according to claim 17, wherein the displaying step further includes the processor overlaying a color on the original tissue image which represents the at least one tissue type, other portions of the original tissue image appearing in grayscale.

21. The method according to claim 17, wherein the displaying step further includes the processor displaying a multiple class digitally enhanced map comprising all of the tissue types present in the original tissue image, each tissue type being displayed in a different visually discernible manner from other tissue types.

22. The method according to claim 17, wherein the displaying step further includes the processor displaying a multiple class digitally enhanced map comprising all of the tissue types present in the original tissue image, each tissue type being displayed in a different visually discernible manner from other tissue types.

* * * * *